United States Patent [19]
Tsukamoto

[11] Patent Number: 5,898,884
[45] Date of Patent: Apr. 27, 1999

[54] DATA PROCESSING SYSTEM INCLUDING A SOLID-STATE MEMORY CAPABLE OF BEING ACCESSED AS A LOCATION EQUIVALENT OF A NON-VOLATILE MEMORY

[75] Inventor: Akihito Tsukamoto, Tokyo, Japan

[73] Assignee: Olympus Optical Co., Ltd., Tokyo, Japan

[21] Appl. No.: 08/579,195

[22] Filed: Dec. 27, 1995

[30] Foreign Application Priority Data

Dec. 27, 1994 [JP] Japan .................................. 6-323457

[51] Int. Cl.$^6$ .................................................. G06F 12/00
[52] U.S. Cl. ...................... 395/800.34; 711/103; 711/115
[58] Field of Search ..................... 395/442, 800, 395/800.01, 282, 800.34, 828; 711/115, 2, 103, 154; 364/131

[56] References Cited

U.S. PATENT DOCUMENTS 5,487,161  1/1996  Koenck et al. .......................... 395/442

5,548,640  8/1996  Blondel et al. ......................... 379/242

*Primary Examiner*—Meng-Ai T. An
*Assistant Examiner*—Walter D. Davis, Jr.
*Attorney, Agent, or Firm*—Pillsbury Madison & Sutro LLP

[57] ABSTRACT

A data processing system includes a CPU, an address decoder for generating a location designation signal which designates a location of a predetermined area of address area meeting a predetermined correspondence relation to a numerical address supplied from the CPU, and a memory securing locations of a plurality of areas capable of being designated by the location designation signal for the address decoder. The address decoder generates a location designation signal designating a location of a predetermined area in the address area corresponding to the numerical address supplied from the CPU in a predetermined relation different from the predetermined correspondence relation in response to an external operation, and designates according to the designation signal designating the location in the different predetermined correspondence relation, a location in a solid-state memory capable of being loaded in and unloaded from the system as a location equivalent to a location of a non-volatile memory in which CPU programs and operation parameters are stored.

3 Claims, 20 Drawing Sheets

DATA PROCESSING SYSTEM INCLUDING A SOLID-STATE MEMORY CAPABLE OF BEING ACCESSED AS A LOCATION EQUIVALENT OF A NON-VOLATILE MEMORY

BACKGROUND OF THE INVENTION

The present invention relates to data processing systems such as personal computers and, more particularly, to a data processing system provided with memory card loading means for loading and unloading a memory card therein.

In the data processing system such as a personal computer, RAM, ROM, I/O, etc. are connected with a CPU by common buses and address signals, data, write signals, read signals and so forth via the common buses for their transmission and reception. The structure of such a prior art system is shown schematically in FIG. 19.

Referring to FIG. 19, a CPU 1 is connected with a RAM 2, a ROM 3, an I/O 4, a memory card 5 and like devices via common address and data buses 6 and 7. The I/O 4 is connected with an operation/display system 8 and serves as a man-machine interface. The CPU 1 and the devices noted above are each supplied with predetermined power from a power supply 9.

In this type of system of FIG. 19, it is required that the CPU 1 can access a specific device, such as the RAM 2, ROM 3, I/O 4 or memory card 5, without accessing the other devices. To this end, the address area in the CPU 1 is assigned to the individual devices as shown in FIG. 20, and an address decoder 10 is provided, which generates a chip select signal (CS1 or CS2) designating a specific device to be accessed by decoding the address signal outputted from the CPU 1.

With this structure, when the CPU 1 is accessing, for instance, area A in the address area shown in FIG. 20, the address decoder 10 makes the chip select signal CS2 effective to select the ROM 3. At this time, no other chip select signal is outputted, and the other devices than the ROM 3 do not respond to the write and the read signal from the CPU 1. In the pertinent data processing operation, the CPU 1 reads out and executes successive programs stored in predetermined areas.

Usually, in the system of the above structure the programs have been previously written in the ROM 3. To write the program in the ROM, they are written in a mask for manufacturing the ROM 3. Alternatively, a ROM capable of writing data therein is used to write the programs before its mounting. The ROM may be mounted using a socket, or directly soldered to the circuit board.

In the above prior art system, however, it is very difficult to provide for a different program operation without updating the ROM program. This does not only pose problems when it is desired to increase the versatility of the system but also is very inconvenient for operation confirmation during manufacture. The operation confirmation requires exclusive programs to be stored previously in the ROM in addition to the operation programs that may be executed by the system. When the operation confirmation process is complicated, the operation confirmation programs may be greater in scale than the programs provided for execution by the system. In such a case, a large capacity ROM is necessary. A design with a restricted ROM capacity inevitably results in an extreme limitation of the operation confirmation items obtainable according to programs which can be stored in the ROM.

In a different aspect, there often arises a need for updating a CPU program (i.e., a program stored in the ROM 3) in order to change or expand the system function. Re-writing of the ROM data requires opening a system body housing even when the ROM is capable of data re-writing. To ensure readiness of the operation, mounting of the ROM in a socket is necessary. In a case in which the ROM capable of data re-writing is directly soldered to the circuit board, the replacement of the ROM requires removal of the solder. This operation is cumbersome and requires skill. In such an operation there is a possibility of copper foil separation from the circuit board.

In order to overcome the above drawbacks in the prior art system, there is a proposal to use a non-volatile memory capable of data re-writing, such as a flush EPROM, and allowing programs once stored in the ROM (i.e., flush EPROM) to be updated using an exclusive program for program re-writing after the start of the system.

According to this method, however, the exclusive program for program re-writing can be executed only in the operative state of the system. Further, such exclusive program for program re-writing provides its function only for updating a program that has been stored. This means that a program re-writing operation is dictated before mounting the ROM, such as when storing a new program when the ROM is blank, for instance, during system manufacture. Therefore, it was necessary to mount the ROM in the socket.

In a further aspect, upon failure of a normal program updating operation, it is impossible subsequently to start the system. It is therefore necessary to re-write the ROM data using an exclusive writing means after removing the ROM. This operation of course requires opening the system housing and is therefore, cumbersome, so that the program updating can not be made readily and frequently.

SUMMARY OF THE INVENTION

The present invention has been provided in the light of the foregoing, and it is an object of the invention to provide a system which permits a different program from one stored in a ROM to be executed without updating the stored program and also permits a ROM program to be written afresh or updated after the ROM is mounted as well.

According to a first aspect of the present invention, there is provided a data processing system comprising a CPU, an address decoder for generating a location designation signal which designates a location of a predetermined area of address area meeting a predetermined correspondence relation to a numerical address supplied from the CPU, and a memory securing locations of a plurality of areas capable of being designated by the location designation signal for the address decoder, wherein the address decoder generates a location designation signal designating a location of a predetermined area in the address area corresponding to the numerical address supplied from the CPU in a predetermined relation different from the predetermined correspondence relation in response to an external operation, and designates according to the designation signal designating the location in the different predetermined correspondence relation, a location in a solid-state memory capable of being loaded in and unloaded from the system as a location equivalent to a location of a non-volatile memory in which CPU programs and operation parameters are stored.

This aspect makes it possible to allow operation of the data processing system according to a program different from one stored in the ROM without updating the stored program, and also to permit the ROM program to be written afresh or updated after the mounting of the ROM as well.

According to a second aspect of the present invention, there is provided the data processing system of the first aspect, which further comprises operating means operable by an operator for causing an operation of the address decoder to switch the correspondence relation between a numerical address supplied from the CPU and the location of a corresponding predetermined area in the address area, between the predetermined correspondence relation and another correspondence relation.

This second aspect makes it possible to allow operation of the data processing system according to a program different from one stored in the ROM without updating the stored program and also the fresh writing or updating the ROM program after the mounting of the ROM according to the operator's operation of the operating means.

According to a third aspect of the present invention, there is provided the data processing system of the second aspect, wherein the operating means includes state maintaining means, which functions in response to the initial operation of the operating means to obtain and maintain a state for specifying the correspondence relation switching operation such that the maintained state is not changed by a subsequent operation of the operating means other than the initial operation, the correspondence relation switching operation being provided on the address decoder according to the output of the state maintaining means.

In this third aspect, in addition to the effect of the second aspect, when the same state as that brought about in response to the operation of the operating means is brought about without the operator's invention, the state maintaining means functions to avoid an occurrence of the address area assignment change that might otherwise take place with the functioning of the address decoder. It is thus possible to maintain stable operation at all times.

According to a fourth aspect of the present invention, there is provided the data processing system of the third aspect, which further comprises resetting means for resetting the CPU when the supply voltage supplied to the system or to the CPU is not meeting a prescribed level or when an initializing means for initializing the system is operated. The operating means includes the state maintaining means for obtaining, upon release of resetting by the resetting means, a state for specifying the correspondence relation switching operation and maintaining the obtained state such as not to be changed by an operation of the initializing means subsequent to the initial operation thereof.

In this fourth aspect, in addition to the effect of the invention as the third aspect, the function of the state maintaining means in connection with the third aspect, is provided upon release of the resetting provided by the resetting means after the functioning thereof caused when the supply voltage is not meeting a prescribed level or when initializing the system.

According to a fifth aspect of the present invention, there is provided a data processing system comprising: a main CPU; an address decoder for specifying a location of a predetermined area in the address area that meets a predetermined correspondence relation to a numerical address supplied from the main CPU to output a location designation signal designating this location, and capable of outputting, in response to an external operation, a location designation signal designating a location of a solid-state memory, which can be loaded in and unloaded from the system, as a predetermined area location in the address area corresponding to the numerical address supplied from a main CPU with the different correspondence relation as the predetermined correspondence relation, which is a location equivalent to a location of a non-volatile memory in which main CPU programs and operation parameters are stored; and a sub-CPU for providing a correspondence relation switching operation for switching the correspondence relation between a numerical address supplied from the main CPU and the location of a corresponding predetermined area in the address area in the address decoder, between the predetermined correspondence relation and another correspondence relation.

In this fifth aspect, the sub-CPU can control the generation of a change in the address area assignment in the address decoder in connection with allowing the operation of the data processing system according to a program different from one stored in the ROM without updating the stored program and permitting the fresh writing or updating of the ROM program after the mounting of the ROM. It is thus possible to permit ready execution of a complicated assignment change operation.

According to a sixth aspect of the present invention, there is provided the data processing system of the fifth aspect, wherein the sub-CPU recognizes and memorizes a correspondence relation to be selected by selecting means for selecting a correspondence relation between a numerical address supplied from the main CPU and the location of a corresponding predetermined area in the address area in the address decoder when the system is started, supplies a reset signal to the main CPU, causes a power supply circuit to supply power to the main CPU, supplies the recognized and memorized correspondence relation to be selected to the address decoder right before the releasing of the reset signal, upon operation of initializing means of the system after the start of the system, recognizes and memorizes the correspondence relation as prescribed by the selecting means, supplies a reset signal to the main CPU, and supplies the correspondence relation to be selected as recognized and memorized right before the releasing of the reset signal to the address decoder.

In this sixth aspect, in addition to the effect of the fifth aspect, starting the system by turning on the power supply, causes the CPU to rise automatically from the reset state, and at this time an address area assignment (or a change in the assignment) is generated by action of the address decoder under control of the sub-CPU, this state being maintained. The same effect is obtained when the system is maintained. Thus, it is possible to avoid occasional generation of an address area assignment change in the address decoder, and stable operation can be maintained at all times.

According to a seventh aspect of the present invention, there is provided a data processing system comprising: a main CPU; an address decoder for specifying a location of a predetermined area in the address area that meets a predetermined correspondence relation to a numerical address supplied from the main CPU to output a location designation signal designating this location, and capable of outputting, in response to an external operation, a location designation signal designating a location of a solid-state memory, which can be loaded in and unloaded from the system, as a predetermined area location in the address area corresponding to the numerical address supplied from the main CPU with the different correspondence relation the predetermined correspondence relation, which is a location equivalent to a location of a non-volatile memory in which main CPU programs and operation parameters are stored; and operation means for providing a correspondence relation switching operation for switching the correspondence relation between a numerical address supplied from the main CPU and the location of a corresponding predetermined area in the address area in the address decoder, between the predetermined correspondence relation and other correspondence relation, wherein the CPU programs and operation parameters in a pertinent location of the non-volatile memory are substituted for, according to a correspondence relation between a correspondence relation between a numerical address supplied from the CPU and the location in a corresponding predetermined memory area as prescribed by the state of the address decoder switched by the operating means, with the CPU programs and operation parameters in a location of a solid-state memory loadable in and unloadable from the system that is equivalent to the location in the prescribed correspondence relation. The location of the solid-state memory in which the CPU programs and operation parameters are stored is made to correspond to a location different from the initial location.

In this seventh aspect, in addition to being able to permit the operation of the data processing system according to a program different from one stored in the ROM without updating the stored program and also the fresh writing or updating of a ROM program after the mounting of the ROM as well, it is possible to prepare solid-state recording media (such as memory cards), in which different programs are stored, and which can be loaded in and unloaded from the system. This permits a relatively large variety of program changes to be readily made.

According to an eighth aspect of the present invention, there is provided the data processing system according to the seventh aspect, wherein the non-volatile memory is a re-writable memory, and when a program for updating data in the non-volatile memory and data to be newly stored in the non-volatile memory are stored in a pertinent location of the solid-state memory that is used, the CPU executes according to a correspondence relation switching operation of the operating means a program for updating the non-volatile memory data in the corresponding location of the solid-state memory member to re-write the data in the corresponding location of the non-volatile memory with the data to be newly stored in the non-volatile memory as the solid-state memory.

In this eighth aspect, in addition to the effect of the seventh aspect, it is possible to permit changes in basic specifications of the system by re-writing non-volatile memories and without opening the system housing.

According to a ninth aspect of the present invention, there is provided a data processing system comprising: a main CPU; an address decoder for specifying a location of a predetermined area in the address area that meets a predetermined correspondence relation to a numerical address supplied from the main CPU to output a location designation signal designating this location, and capable of outputting, in response to an external operation, a location designation signal designating a location of a solid-state memory, which can be loaded in and unloaded from the system, as a predetermined area location in the address area corresponding to the numerical address supplied from the main CPU with the different correspondence relation. The predetermined correspondence relation is a location equivalent to a location of a non-volatile memory in which main CPU programs and operation parameters are stored. A data re-writing means for, when a program for updating data in the non-volatile memory and data to be newly stored in the non-volatile memory are stored in a pertinent location of the solid-state memory according to a correspondence relation operation of the operating means, executing a program for updating the data in the non-volatile memory in the pertinent solid-state memory member location, and for starting an operation of re-writing the data in the pertinent non-volatile memory location with data to be newly stored in the non-volatile memory.

In this ninth aspect, in addition to being able to permit the operation of the data processing system according to a program different from one stored in the ROM without updating the stored program and also freshly writing or updating a ROM program after mounting of the ROM as well, with the preparation of solid-state recording media, in which different programs are stored, and which can be loaded in and unloaded from the system. It is possible to change the basic specifications of the system by writing to the non-volatile memories according to such programs without the need to open the system housing.

According to a tenth aspect of the present invention, there is provided the data processing system of the ninth aspect, which further comprises means for independently causing the correspondence relation switching operation of the operating means with respect to the address decoder and the operation of data re-writing means to re-write the non-volatile memory data.

In this tenth aspect, in addition to the effect of the ninth aspect, it is possible to bring about independently and selectively the function of changing basic system specifications through non-volatile memory re-writing and the function of causing operation of the system according to a program different from one stored in the ROM without updating the stored program.

According to an eleventh aspect of the present invention, there is provided the data processing system of the ninth aspect, which further comprises a sub-CPU provided separately from the CPU for executing the correspondence relation switching operation and the data re-writing operation.

In this eleventh aspect, in addition to the effect of the ninth aspect, it is possible to obtain large varieties of selections and updatings under control of the sub-CPU, as well as providing independently and selectively the function of changing basic system specifications through non-volatile memory re-writing and the function of causing operation of the system according to a program different from one stored in the ROM without updating the stored program.

According to a twelfth aspect of the present invention, there is provided the data processing system of the first, fifth, seventh or ninth aspect wherein the correspondence relation switching operation of the operating means, the address decoder functions to making a location of the solid-state memory member that is employed to correspond to a memory in the CPU.

In this twelfth aspect, in addition to the effect of the first, fifth, seventh or ninth aspect, by using suitable loadable and unloadable solid-state recording media (such as memory cards), it is possible to increase the internal memory capacity without need of opening the system housing.

This permits enhancing the basic capacity of the system.

According to a thirteenth aspect of the present invention, there is provided the data processing system of the twelfth aspect, further comprising memory card loading/unloading means for loading and unloading a memory card with respect to the system, and video data storing means for storing supplied video data in a memory card loaded by the memory card loading/unloading means, the memory card loaded by the memory card loading/unloading means being capable of being used as the solid-state memory member.

In this thirteenth aspect, in addition to the effect of the twelfth aspect, ready handling is possible, and this effect is obtainable by using readily commercially available memory cards.

Other objects and features will be clarified from the foregoing description with reference to attached drawings.

PREFERRED EMBODIMENTS OF THE INVENTION

Figure 1:
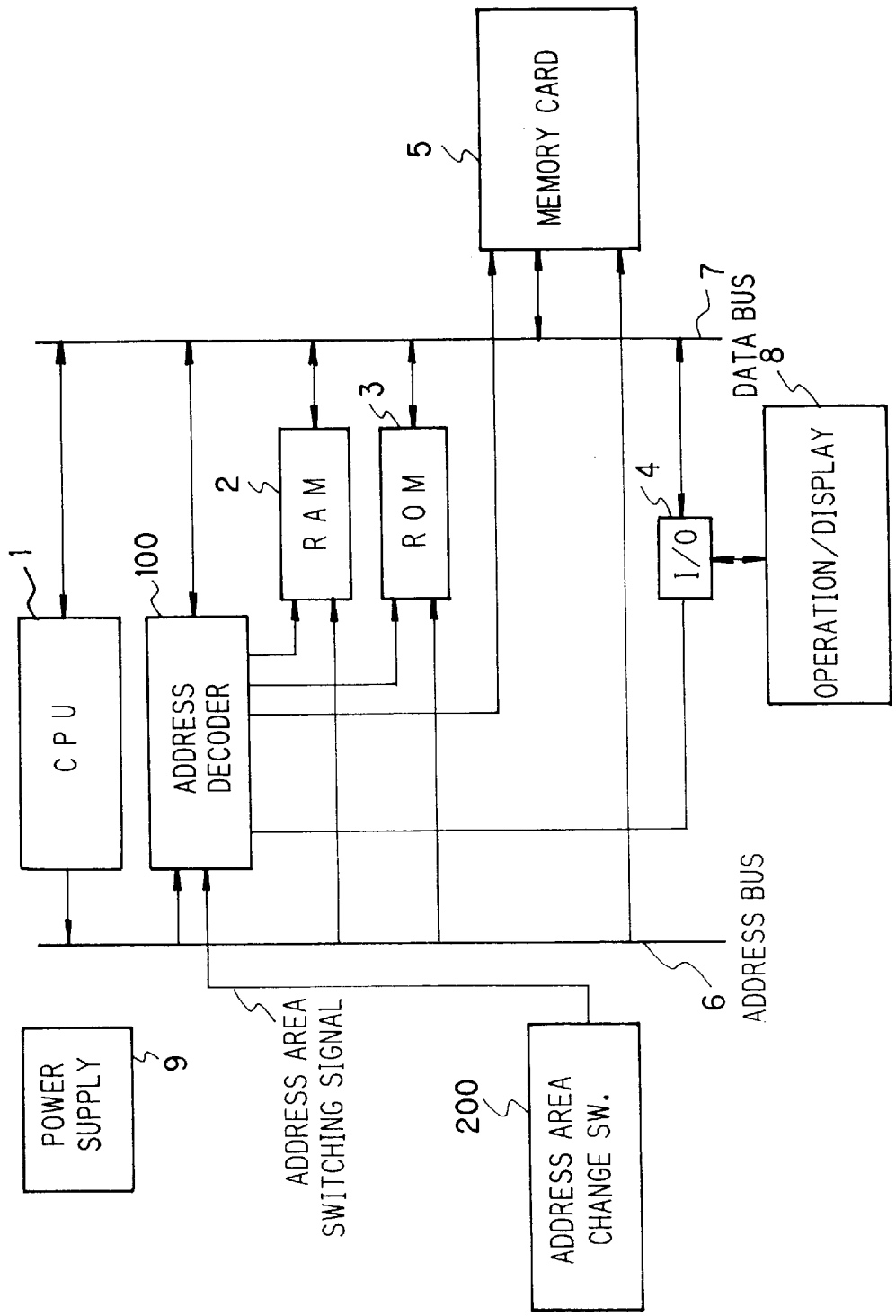
FIGS. 1 through 10 are block diagrams showing first through tenth embodiments of the invention.
Figure 19:
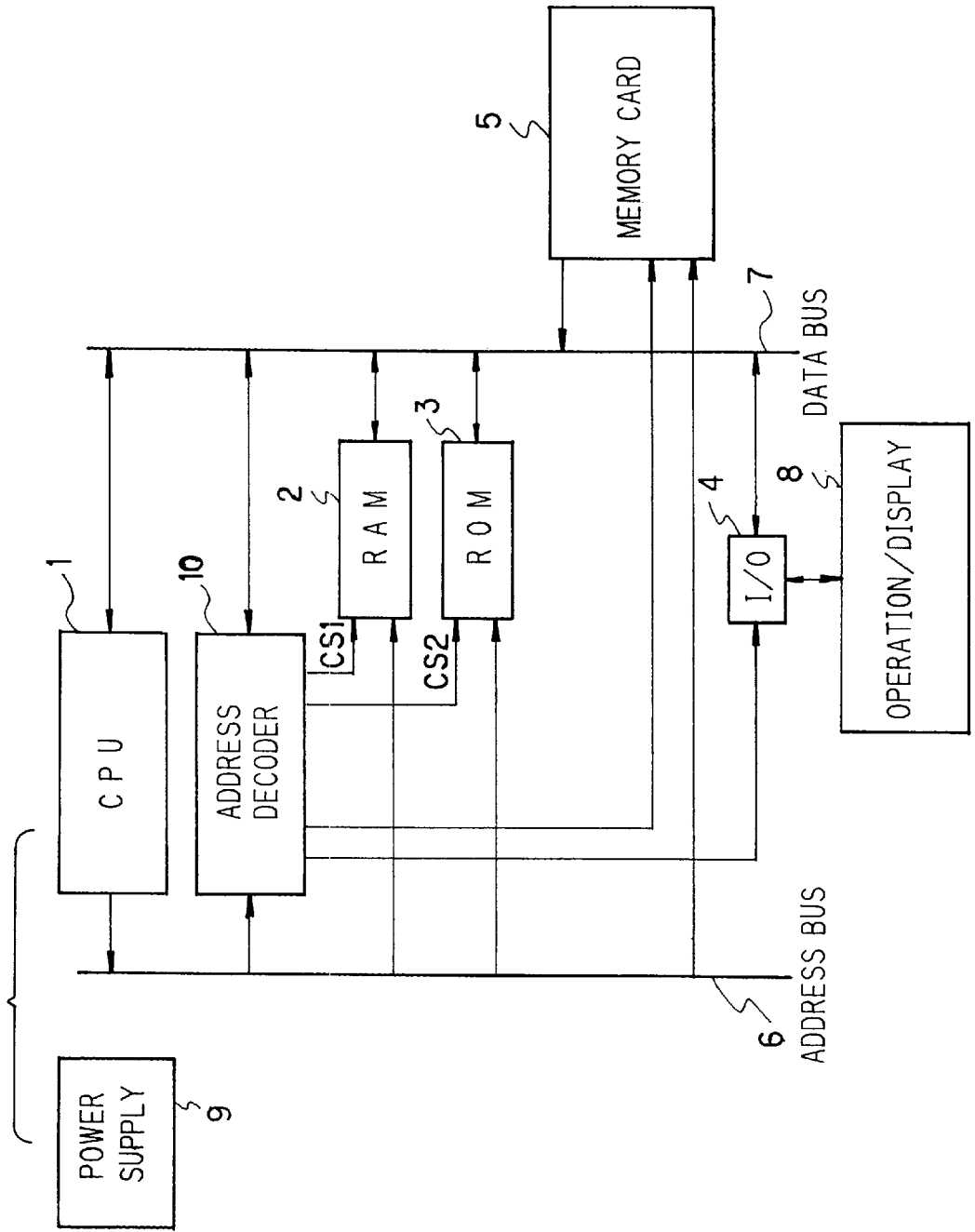
FIGS. 19 and 20 are a structure of a prior art system and a drawing for explaining the prior art system.
Figure 20:
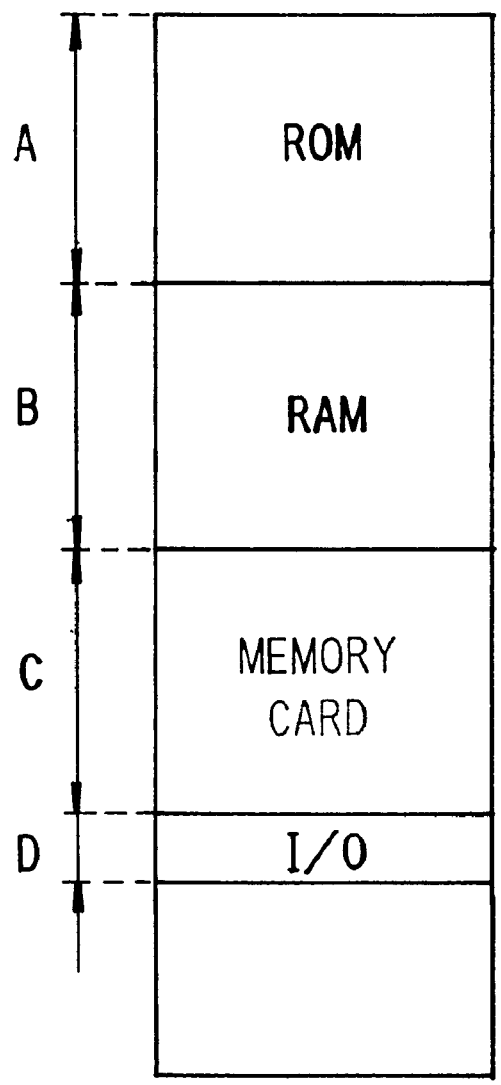

FIG. 1 is a block diagram showing a first embodiment of the present invention. Like the FIG. 19 prior art system, a CPU 1 is connected with a RAM 2, a ROM 3, I/O 4, a memory card 5 and like devices via common address and data buses 6 and 7 for transmitting and receiving the address signal, data, write signal, read signal and so forth. The I/O 4 is connected with an operation/display system 8 and serves as a man-machine interface relay. The memory card 5 is a solid recording medium and can be inserted and taken out from a well-known card slot provided in the system. The CPU 1 and inter-connected devices are each supplied with predetermined power from power supply circuit 9.

Further, like the prior art system, an address decoder 100 is provided, which generates a chip select signal designating a specific one of the devices, i.e., the RAM 2, ROM 3, I/O 4 and memory card 5, to be accessed by the CPU 1 by decoding the address signal outputted from the CPU 1 lest the CPU 1 should address any other device than the specific one. However, unlike the prior art system, the address decoder 10, can change the address area in effect as shown in FIG. 11 according to an address area switching signal, which is provided in response to the operation of an address area change switch 200 serving as operation means.

Figure 11:
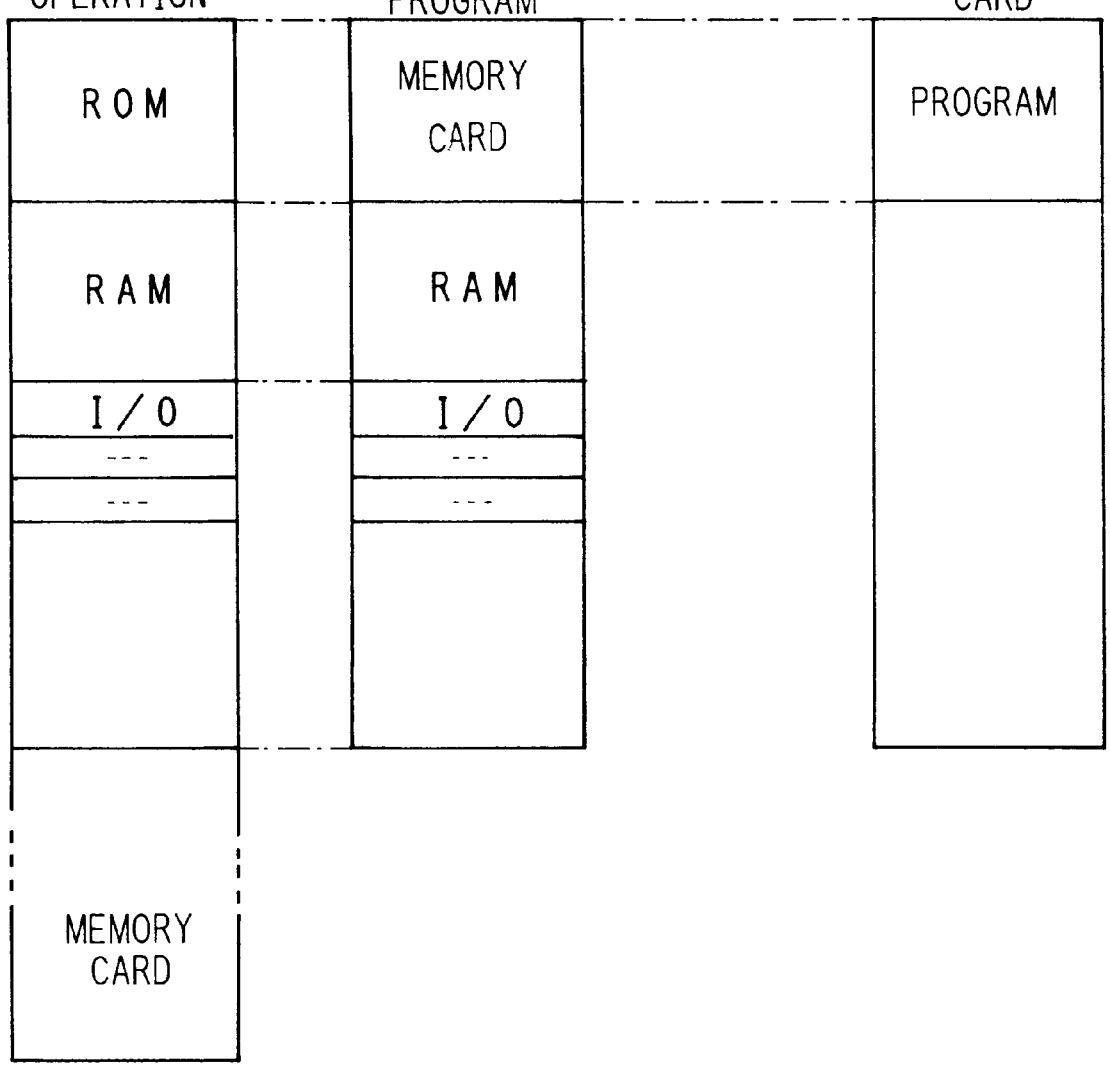
FIG. 11 is a drawing for explaining the first embodiment.

As shown in FIG. 11, responsive to operation of the switch 200 an area which normally corresponds to the ROM 3, for instance, in the address area assignment in the CPU 1, is changed to a memory location (a specific program stored) of the memory card 5. With such address area assignment change of the area effected by the address decoder 100 according to the address area change signal provided in response to the operation of the address area change switch 200, the CPU 1 having initially been operating according to a program in the ROM 3, operates according to the specific program in that memory location of the memory card 5.

Figure 2:
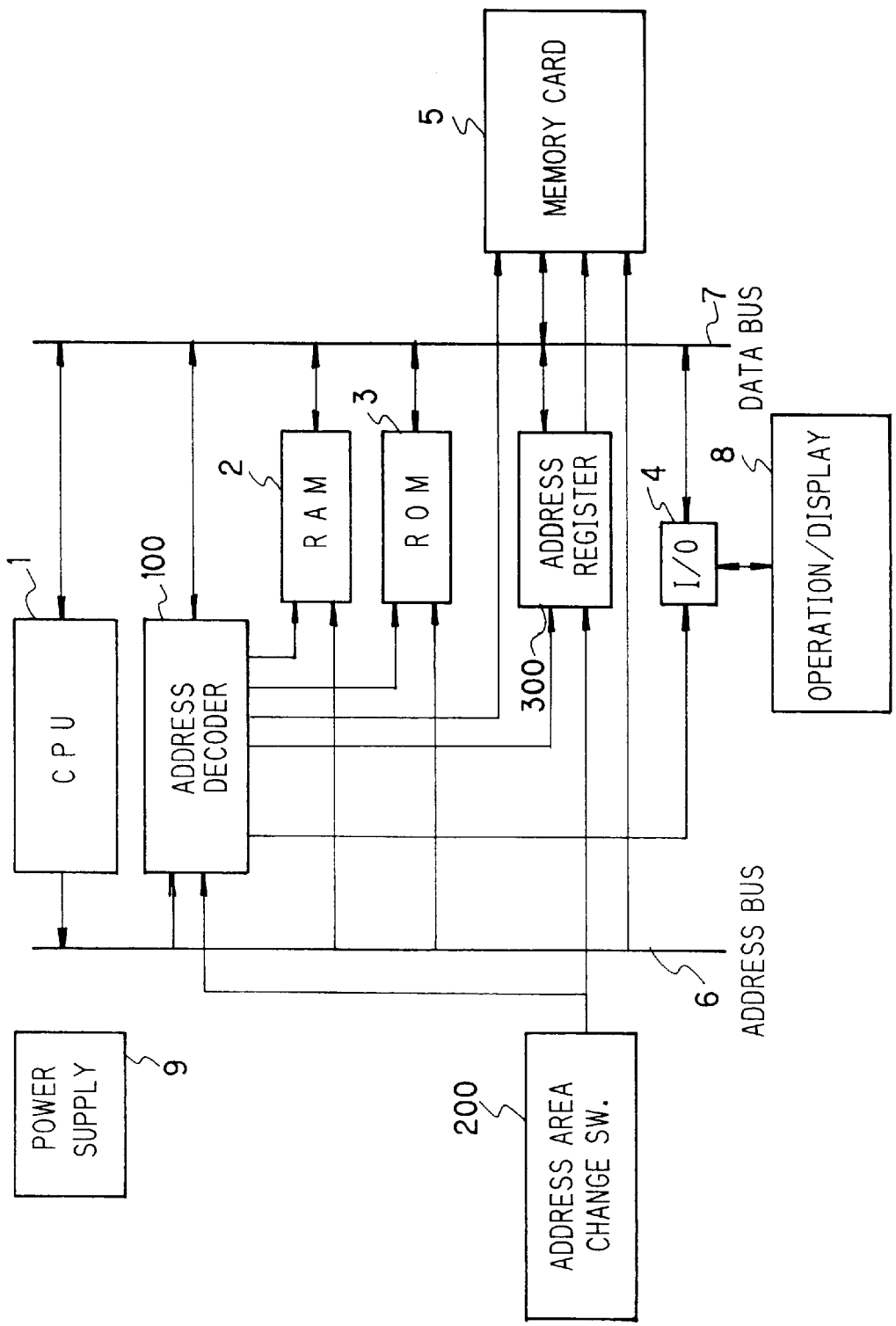

FIG. 2 is a block diagram showing a second embodiment of the present invention. Parts corresponding to those in the FIG. 1 first embodiment are designated by like reference numerals and not given repetitive description. A difference of the second embodiment from the preceding first embodiment resides in the provision of an address register 300, which serves to hold an upper address of a program storage area (i.e., memory location) of memory card 5 so as to be able to deal with a case where that area is greater than the address area of the CPU 1 as well.

Figure 12:
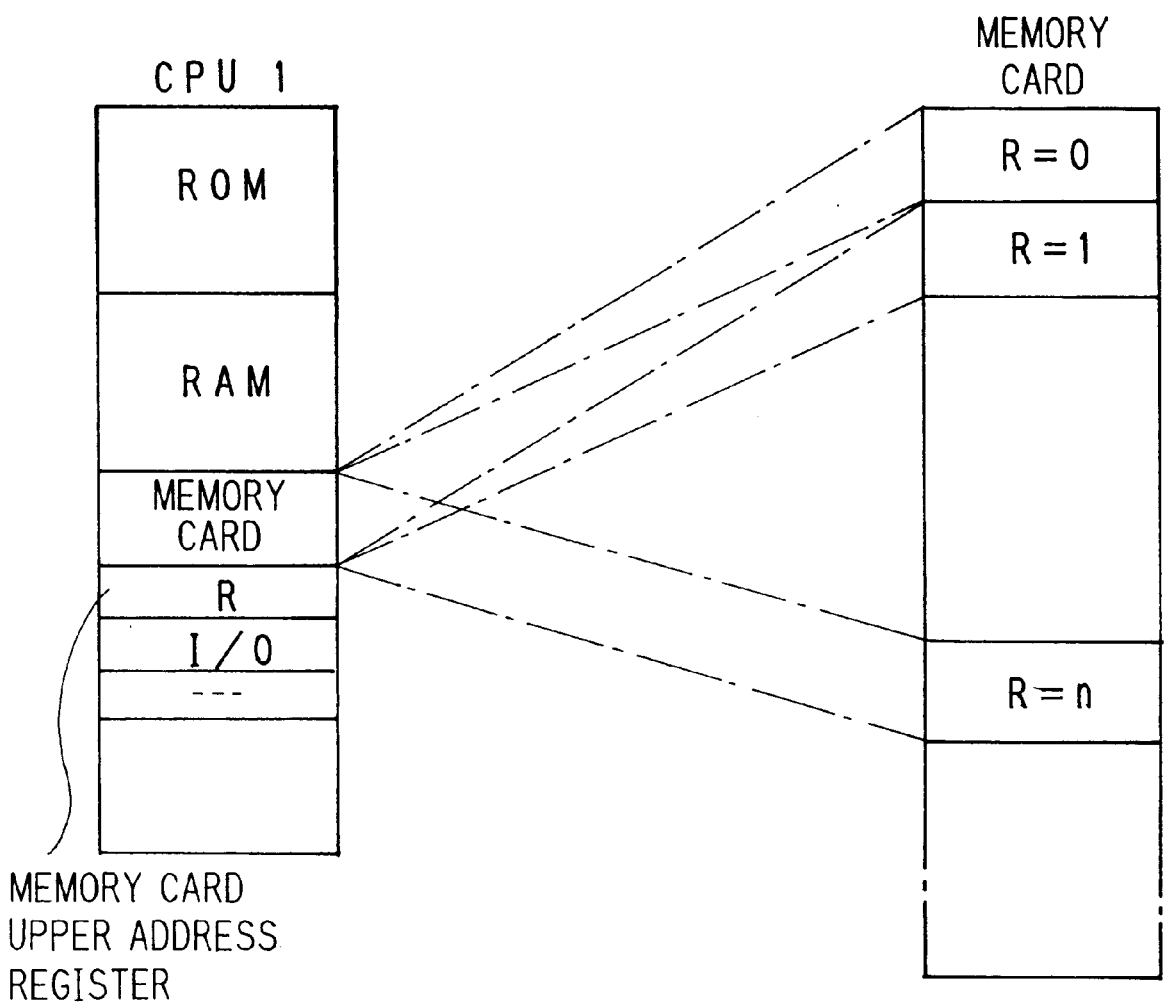
FIGS. 12 and 13 are drawings for explaining the second embodiment.
Figure 13:
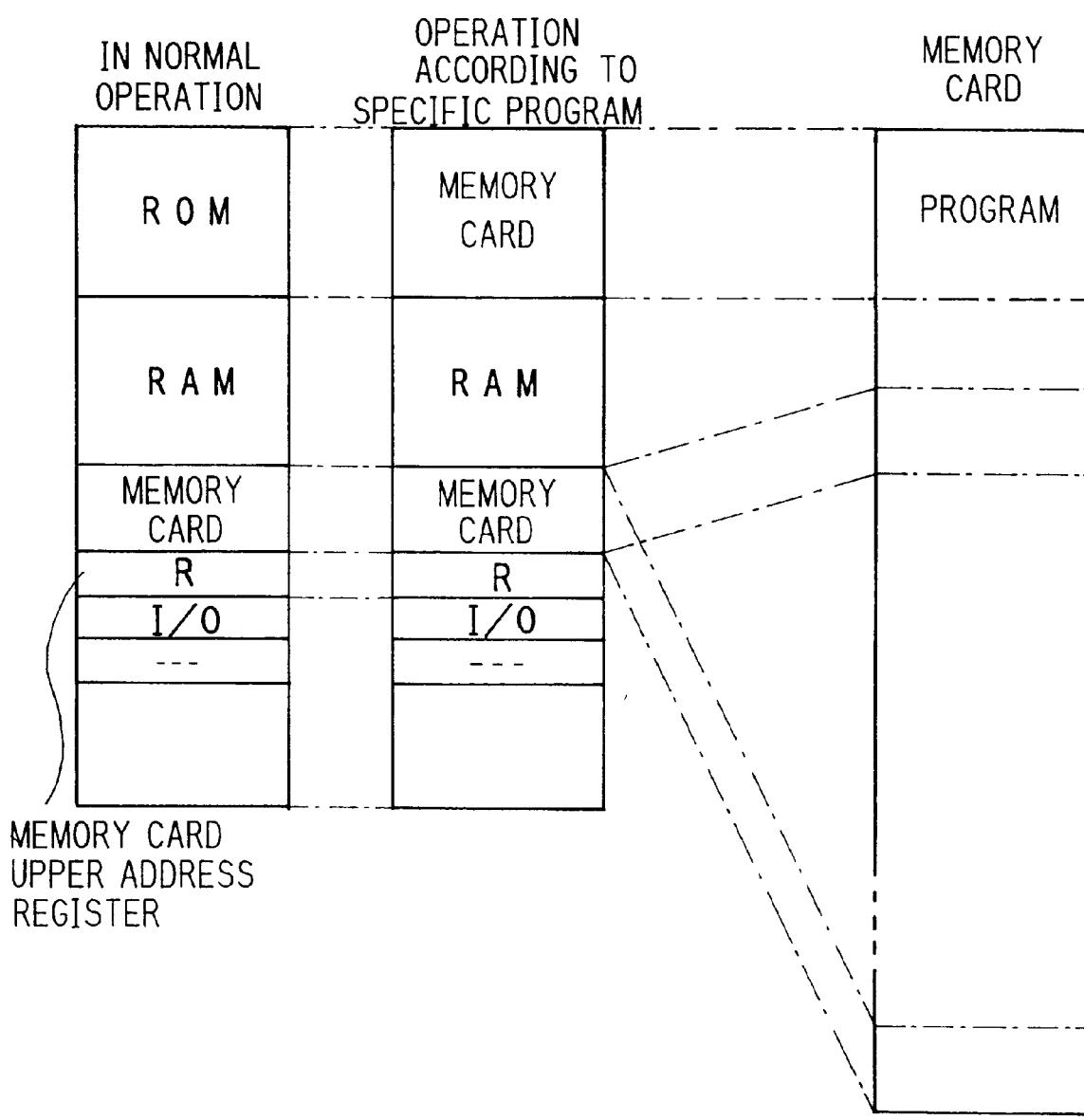

In this embodiment, as shown in FIG. 12, an area permitting the accessing of only part of the memory card 5 is provided in the address area of the CPU 1. In other words, only lower bits of the address signal regarding the memory card 5 are directly outputted as the address signal from the CPU 1. The address register 300 outputs upper bits of the address signal regarding the memory card 5. The upper bits are set when an upper address is written in the address register 300 by the CPU 1. The address area in the CPU 1 is assigned to the address register 300 as shown in FIG. 13, for instance.

In normal operation, the CPU 1 writes a memory card area to be accessed in the address register 300. Subsequently, the CPU address area part that is assigned to the memory card 5 is accessed. In this way, the memory card area that is set in address register 300 is accessed. Re-writing this set area means re-writing data in the address register 300.

In the FIG. 2 structure, when the CPU 1 outputs an address signal for accessing the ROM 3, for instance, the address decoder 100 issues a chip select signal to the ROM 3. When the address area change switch 200 is operated, the address decoder 100, as shown in FIG. 13, switches the chip select signal destination at the time of the provision of the address signal for accessing the ROM 3 from the ROM 3 over to the memory card 5. Also by the above switch operation a predetermined value is forcibly set in the address register 300. Now, the ROM 3 can not be accessed from the CPU 1. Instead, a specific area of the memory card 5 is accessed.

When the CPU address area assignment is changed in the above way, by subsequently starting the data processing system a specific program in the memory card 5 is executed by the CPU 1.

Figure 3:
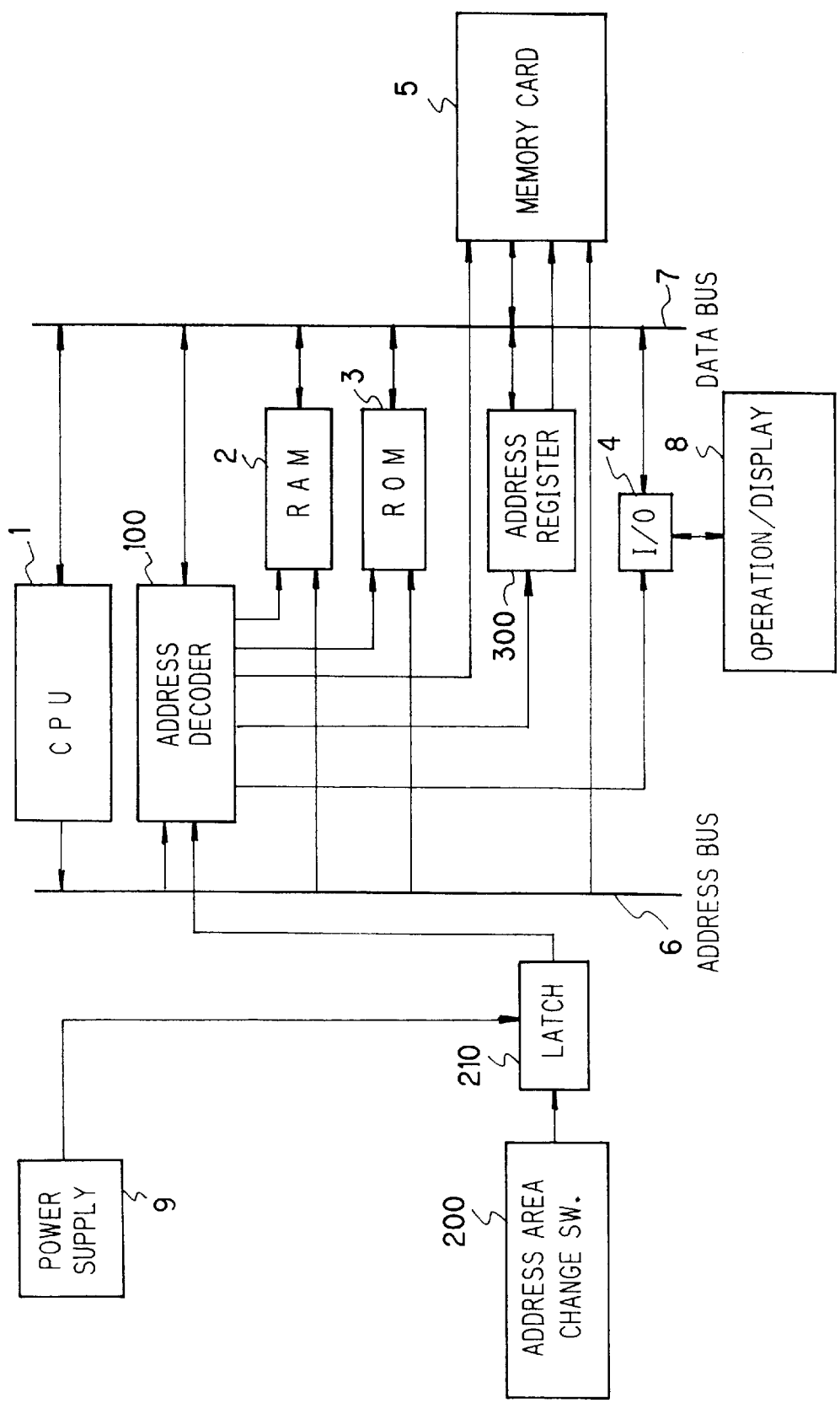

FIG. 3 is a block diagram showing a third embodiment of the present invention. Parts like those in the previous FIG. 1 first embodiment are designated by like reference numerals and not given repetitive description. A difference of this embodiment from the preceding second embodiment resides in that a latch circuit 210 which is driven with the rise of power supply 9, is provided as shown, i.e., on a line along which a command is transmitted from address area change switch 200 to the address decoder 100 and address register 300.

Like the FIG. 2 second embodiment, the address register 300 serves to hold an upper address of a program storage area (i.e., a memory location) of the memory card 5 to be able to deal with a case where that area is greater than the address area of the CPU 1 as well.

The latch circuit 210 functions to retain the state, and a command from the address area change switch 200 is latched and held in the latch circuit 210 before being supplied to the address decoder 100. The address area change switch 200 thus may be a self-restoring switch such as a push-button switch.

When the command from the address area change switch 200 has been held in the latch 210 in response to the rise of the power supply 9, the latch circuit 210 holds its output without change unless the power supply is re-closed. This ensures that a change setting operation once done on the address area change switch 200, allows a CPU address area assignment change to be made by the cooperation of the address decoder 100 and address register 300 without any trouble irrespective of whether the state of assignment is immediately released.

Figure 4:
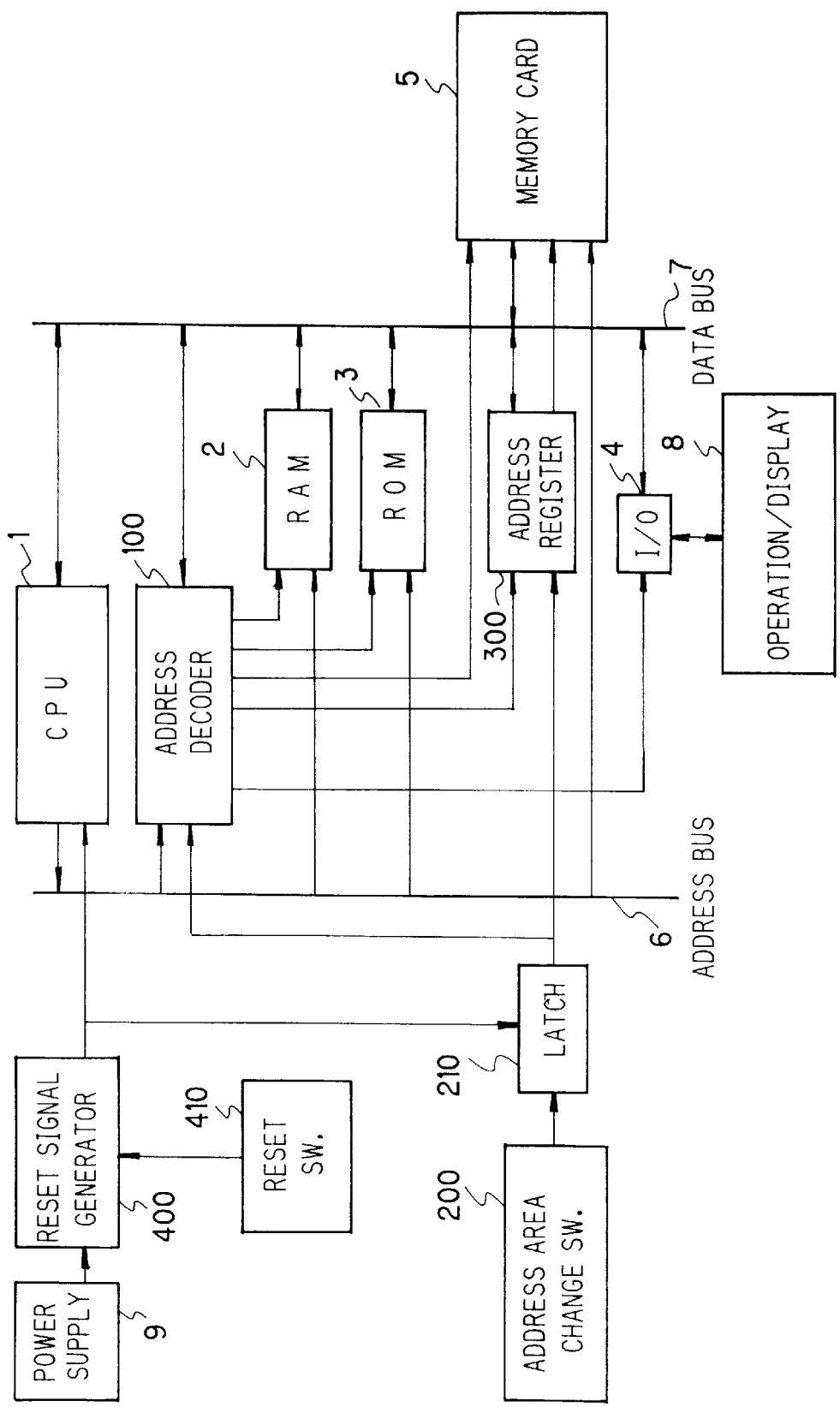

FIG. 4 is a block diagram showing a fourth embodiment of the present invention. Parts like those in, for instance, the preceding FIG. 3 third embodiment are designated by like reference numerals and not given repetitive description. A difference of this embodiment from the third embodiment is that the latch circuit 210 is driven by a reset signal, which is generated from a reset signal generator 400 for resetting CPU 1. The reset signal generator 400 generates a reset signal for a predetermined period of time according to a command signal issued with an operation of a reset switch 410. Alternatively, the reset signal is generated when the voltage of power supply 9 becomes lower than a prescribed level. Like the FIG. 3 third embodiment, the address register 300 is provided to hold an upper address of a program storage area (or memory location) of the memory card 5 in order to be able to deal with a case where that area is greater than the address area of the CPU 1.

Figure 14:
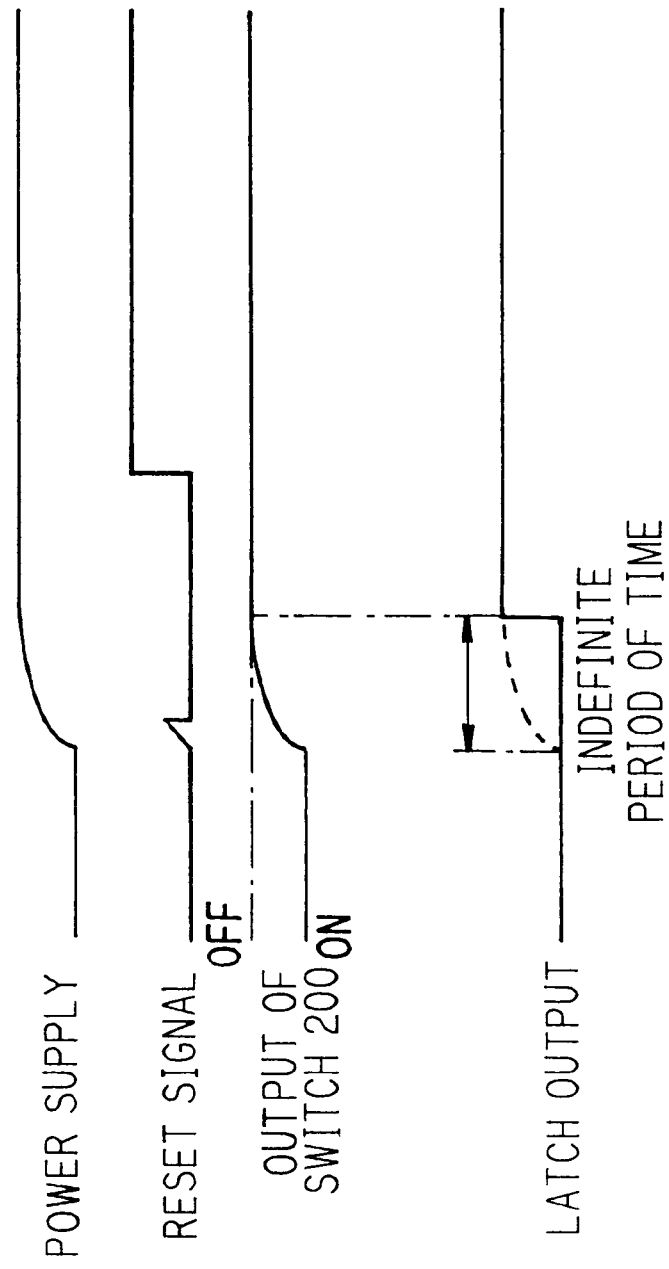
FIGS. 14 and 15 are drawings for explaining the fourth embodiment.
Figure 15:
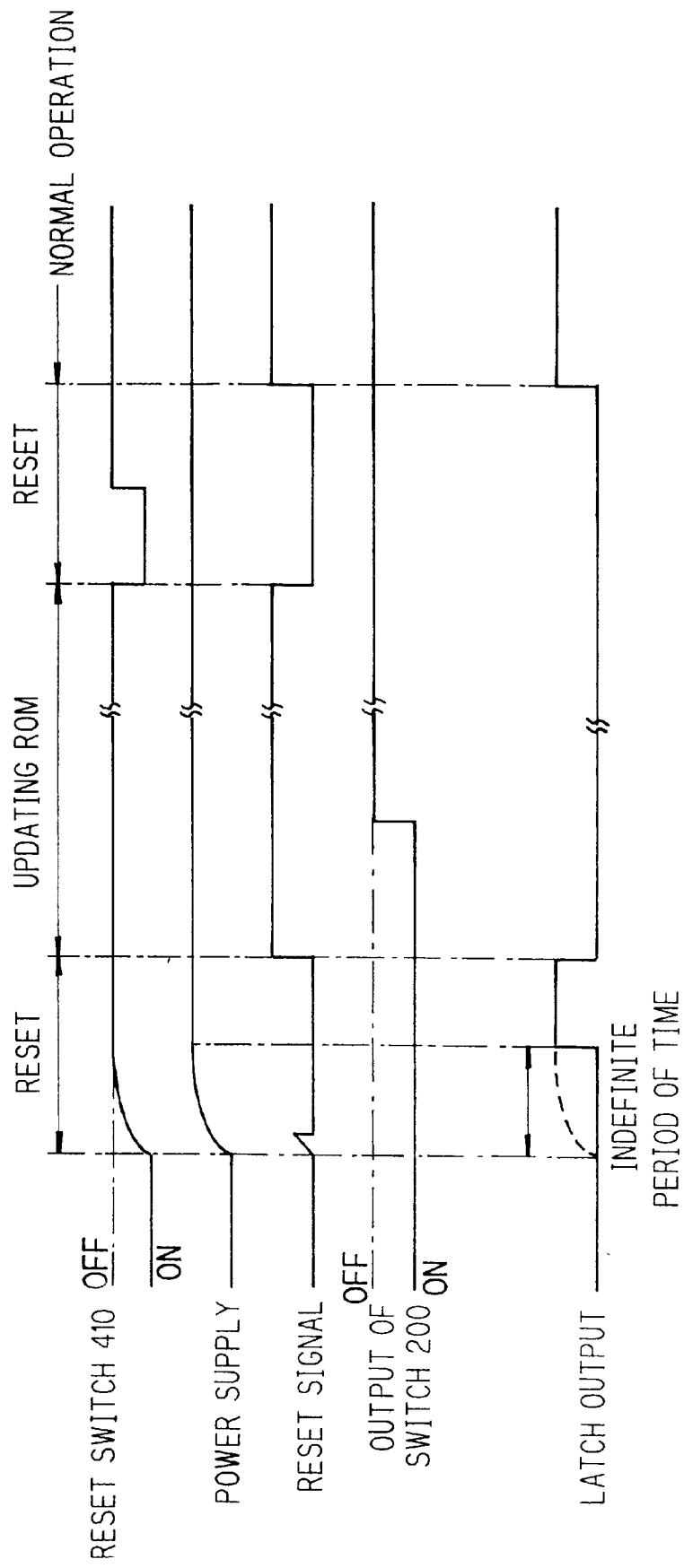

FIG. 14 shows operation timings of the latch circuit 210 in normal operation, i.e., when the reset switch 410 is not operated, and FIG. 15 shows operation timings of the circuit 210 when the same is driven according to a command signal, which is issued from the reset switch 410 in response to the operation of the reset switch 410.

In normal operation as shown in FIG. 14, for a transient period right after the power supply closure until settling of the supply voltage to a prescribed level, the output of address area change switch 200 also is not fixed. The latch circuit 210 thus provides an indefinite output when it is driven during this period of time. During this time period, the reset signal generator 400 provides a reset signal without release. It is thus possible to avoid an inadequate operation of the latch circuit 210 to hold an indefinite value. After the supply voltage has been settled with the lapse of the transient period time noted above, the reset signal is released, and the latch circuit 210 latches the output of the address area change switch 300 which is now normal.

When the address area change switch 200 is operated, the latch circuit 210 operates as shown in FIG. 15. The operation is the same as the FIG. 14 operation until release of the reset signal after the closure of the power supply. During this time period, however, the address area change switch 200 is providing an "ON" (i.e., "L" level) output. Upon release of the reset signal, the latch circuit 210 latches and holds the switch signal. This means that a change operation (turn-off operation) of the address area change switch 200 after the release of the reset signal, has no effect on the output of the latch circuit 210.

With a subsequent operation of the reset switch 410, the reset signal generator 400 outputs a reset signal which is the same as that at the time right after the power supply closure. Up to this moment, the latch circuit 210 holds the output value at the time of the reset signal release right after the power supply closure, but upon release of the reset signal the output of the latch circuit 210 is updated.

In the above way, a change operation on the address area change switch 200, is made effective by a command signal issued from the reset switch 410 with an operation thereof, thus allowing the CPU address area assignment change by the cooperation of the address decoder 100 and address register 300 as described above. Subsequently, like previous embodiments a specific program in the memory card 5 can be executed in the CPU. The specific program in the memory card 5 may be executed by closing the power supply or operating the reset switch 410 while operating the address area change switch 200.

Figure 5:
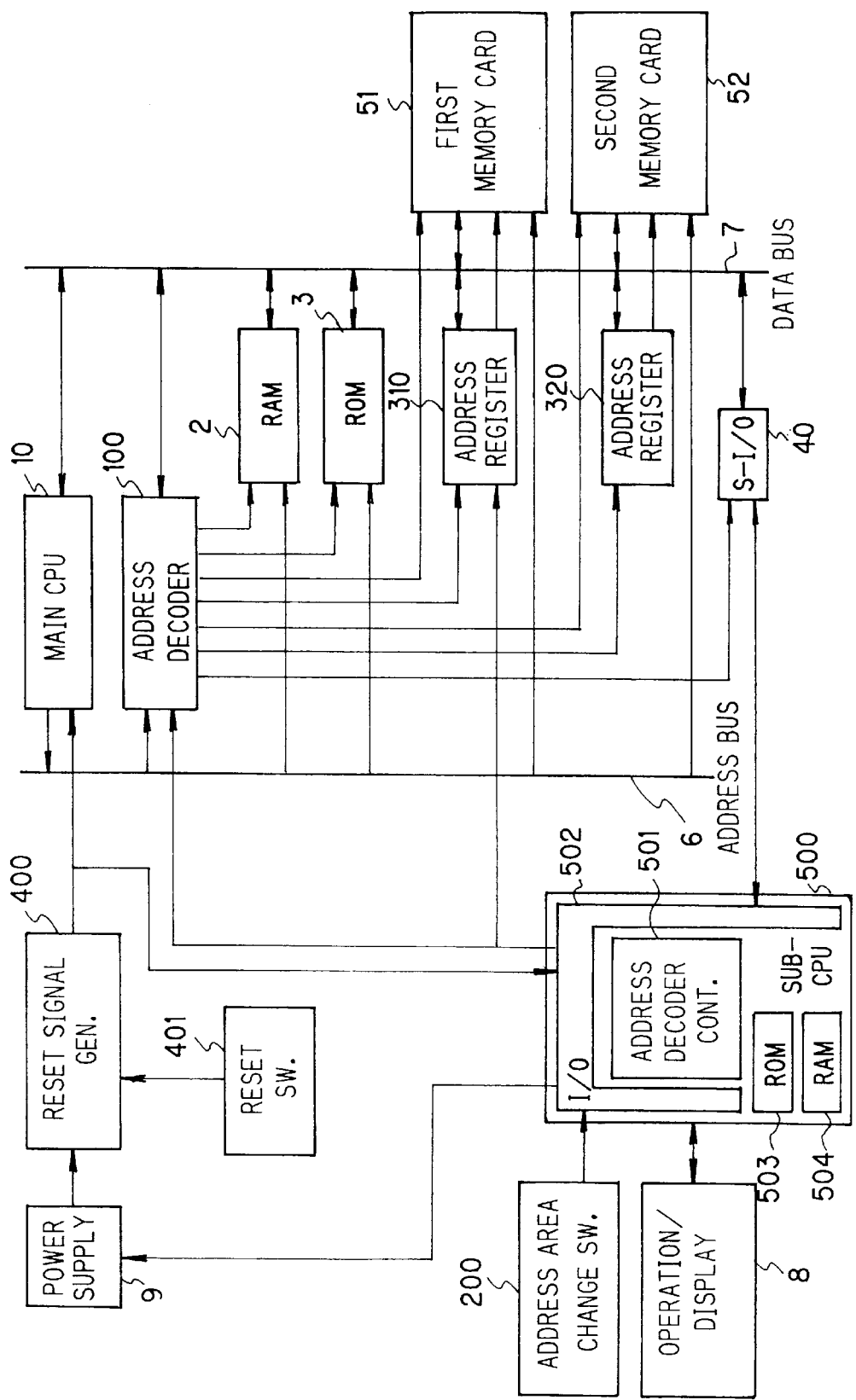

FIG. 5 is a block diagram showing a fifth embodiment of the present invention. Parts like those in the FIG. 4 fourth embodiment are designated by like reference numerals and not given repetitive description. This embodiment is different from the preceding fourth embodiment in that unlike the fourth embodiment, which uses only single CPU 1, this embodiment uses, in addition to a main CPU 10, a sub-CPU 500 for communication via a serial I/O (S-I/O) 40 to let the main CPU 10 recognize the state of the operating system or the display system, as well as controlling the main CPU 10, or the main CPU 10 and peripheries thereof and, if necessary, the entire power supply. The check of the supply voltage and the transient tie process before the settling of the supply voltage are made in the manner as described above.

The sub-CPU 500 includes an address decoder controller 501 for controlling the address area assignment function by the address decoder, an I/O 502, a ROM 503 and a RAM 504, etc. In this embodiment, a plurality of memory cards (i.e., two, i.e., first and second memory cards 51 and 52) can be loaded at a time, and address registers 210 and 320 are provided for these memory cards 51 and 52. When the sub-CPU 500 recognizes a command signal issued from a reset switch 410 in response to the operation of the reset switch 410, it controls the address decoder 100 and address register 310 in response to a change operation of the address area change switch 200 to effect an assignment change of the address area of the main CPU 10 with cooperation of the address decoder 100 and address register 310. Subsequently, a specific program in the first memory card 51, for instance, is executed in the CPU.

Figure 16:
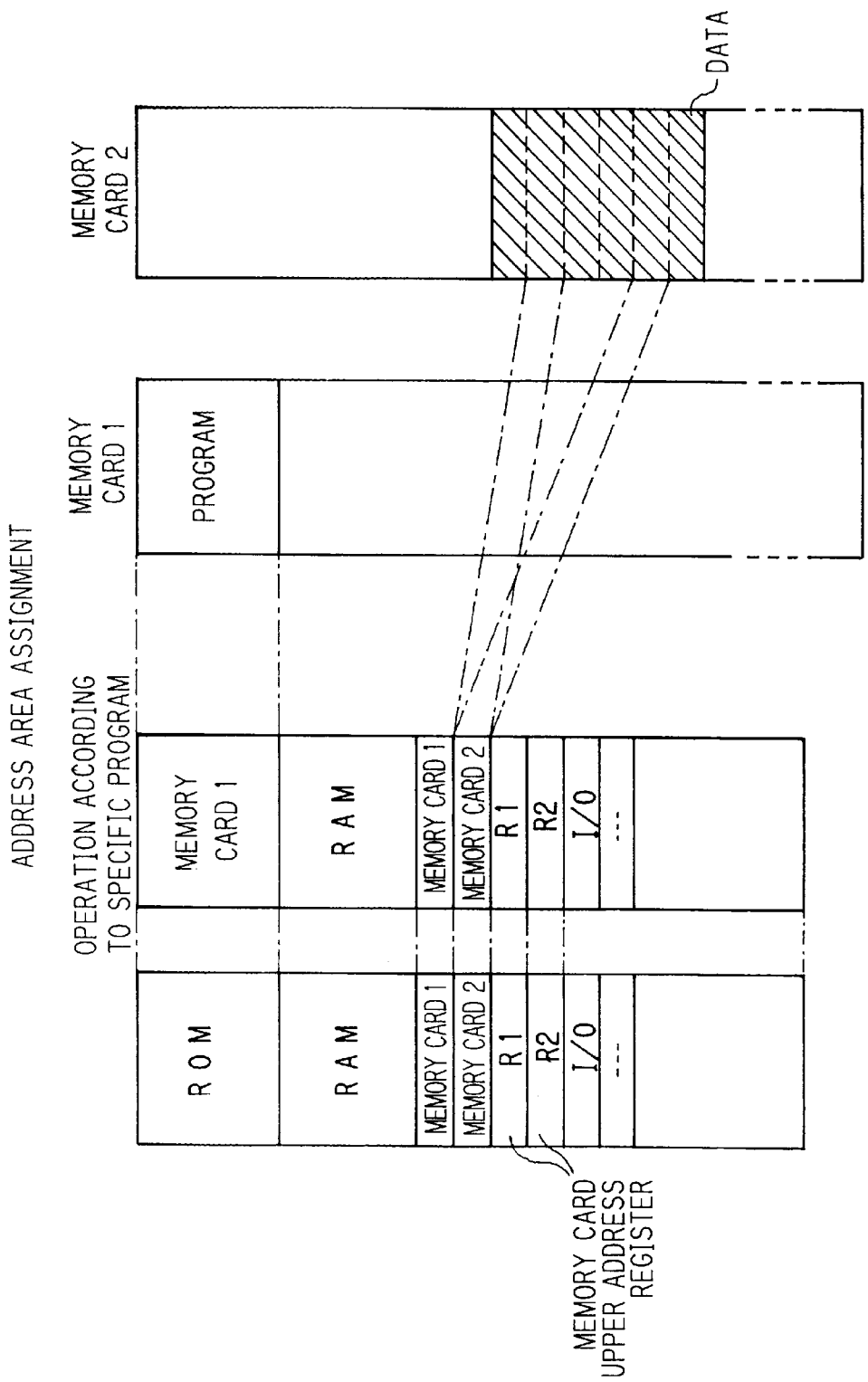
FIGS. 16, 17 and 18 are drawings for explaining the fifth, seventh and eighth embodiments.

During this time, the address decoder controller 501 and I/O 502 in the sub-CPU 500 participate in the control of the address decoder 100 for the address area assignment to the individual devices as shown in FIG. 16. When the assignment of the address area of the main CPU 10 has been changed in this way, a memory card (for instance, the first memory card 51) functions as part of a memory in the main CPU 10, and it receives predetermined restrictions on its use. In this embodiment, however, the other memory cards (for instance, the second memory card 52) do not receive such specific restrictions and has a broad scope of applications.

In this embodiment, the correspondence relation between the memory card and the corresponding address register may be changed. That is, new data may be placed in any area of the memory card (for instance, the first memory card 51). For example, the content of the first memory card 51 may be readily made to have a FAT or directory area so that it conforms to a DOS file system.

Figure 6:
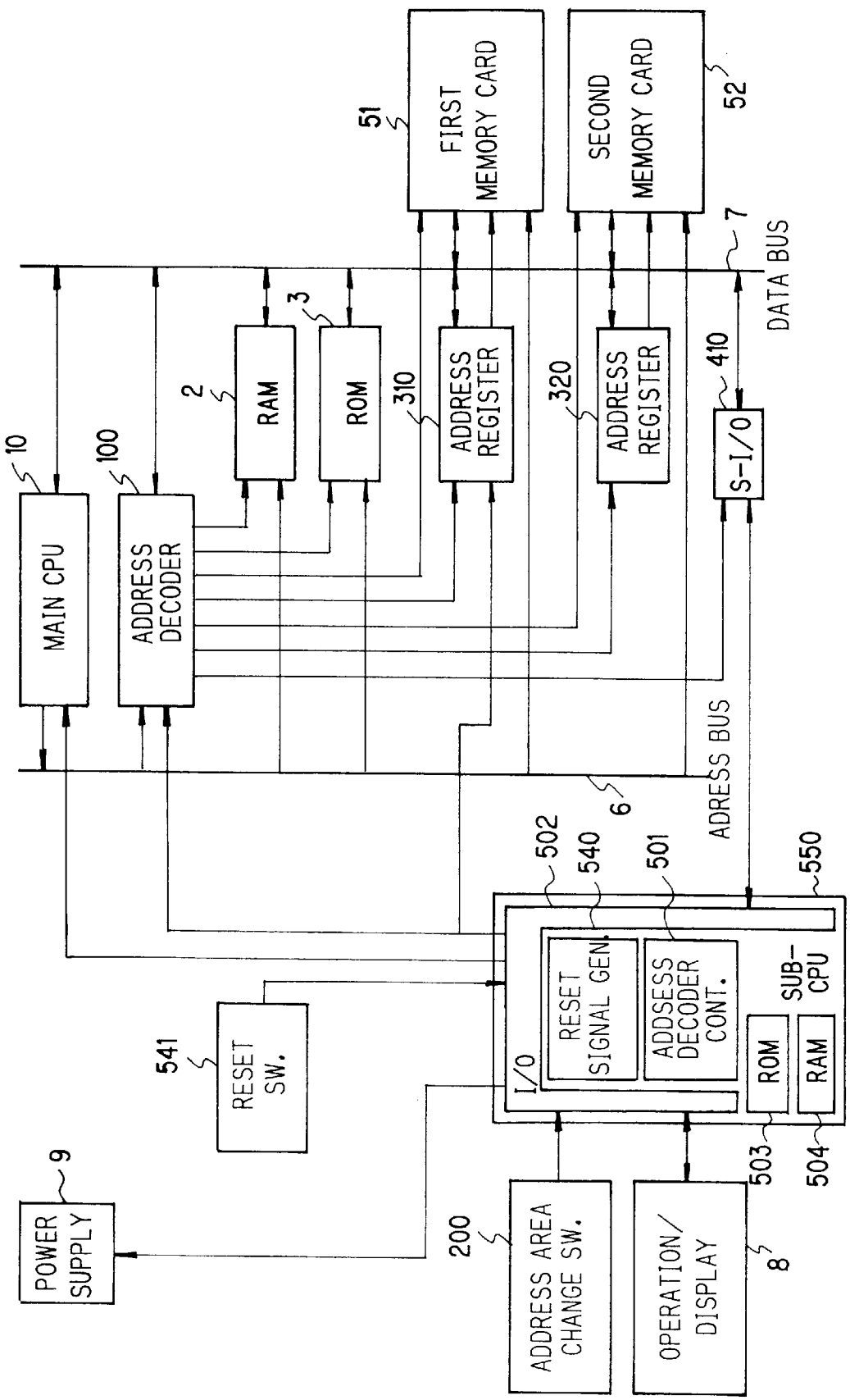

FIG. 6 is a block diagram showing a sixth embodiment of the present invention. Parts like those in the FIG. 5 fifth embodiment are designated by like reference numerals and not given repetitive description. This embodiment is different from the preceding fifth embodiment in that, in lieu of the sub-CPU 500 in the fifth embodiment, a sub-CPU 550 is used, which has enhanced functions and has a role of checking reset switch 541 and the supply voltage as well. The check of the supply voltage by the sub-CPU 550 and the process during the transient time until settling of the supply voltage are made in the manner as described before in connection with the FIG. 4 fourth embodiment.

Figure 7:
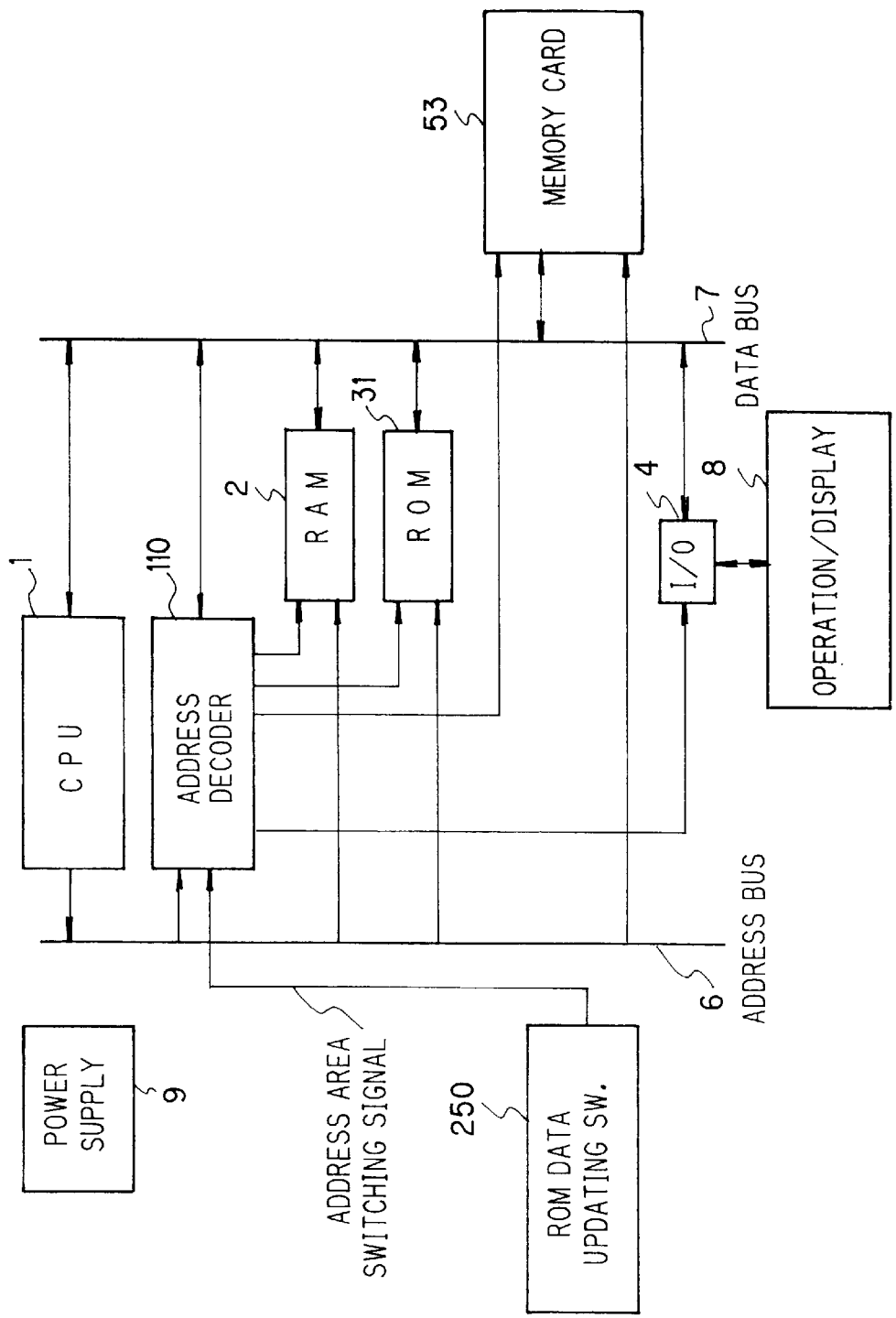

FIG. 7 is a block diagram showing a seventh embodiment of the present invention. This embodiment can be compared to the FIG. 1 first embodiment. While in the FIG. 1 case the address area assignment is changed in effect as shown in FIG. 11 with the functioning of the address decoder 100 according to the address area change signal provided in response to the operation of the address area change switch 200, in this embodiment the address area assignment is changed in effect as shown in FIG. 17 with the functioning of address decoder 110 according to a switching signal provided in response to the operation of a ROM area updating switch 210.

Figure 17:
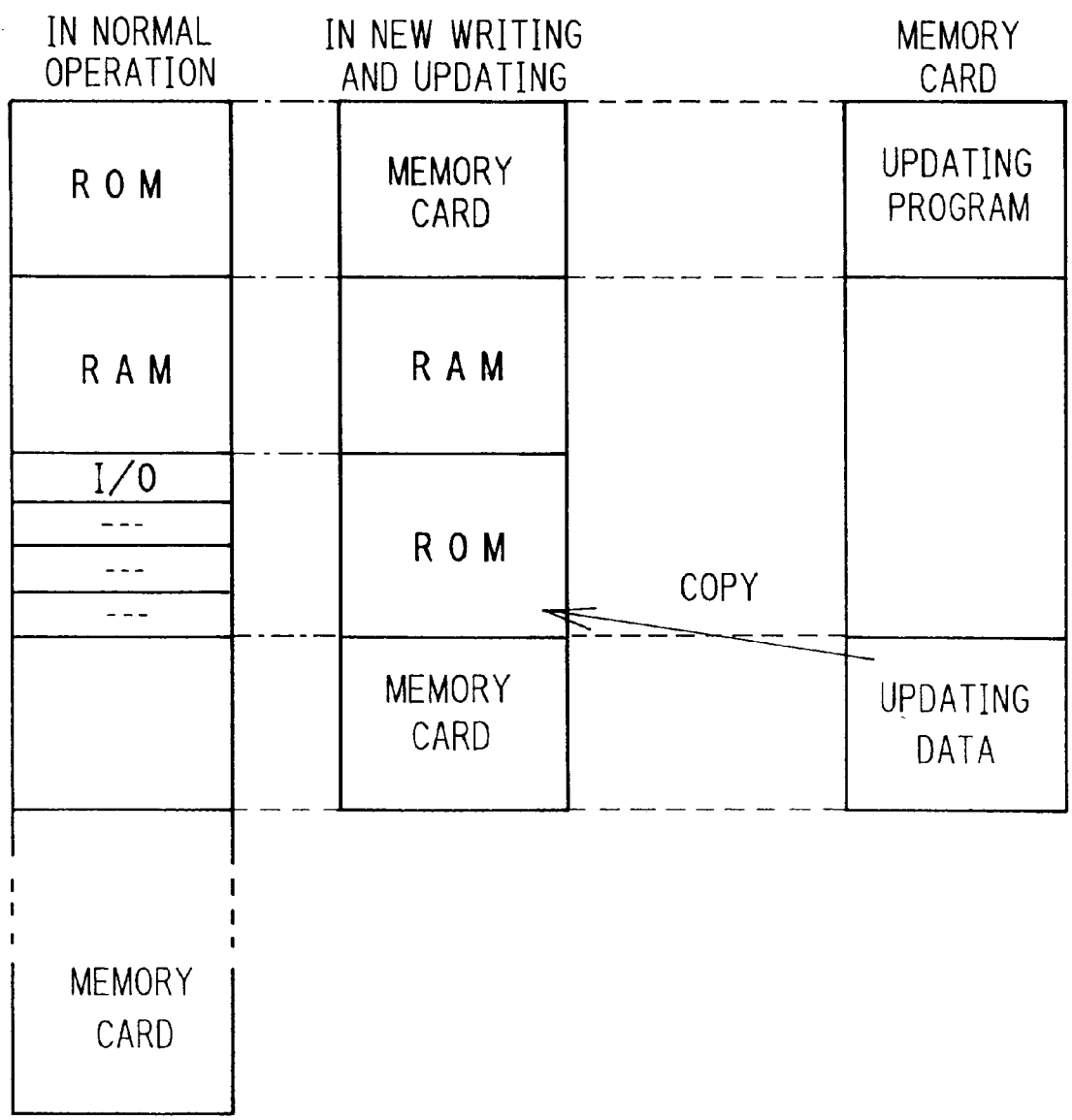

More specifically, in this embodiment the address decoder 110 functions to interchange ROM area and memory card area and secure a separate ROM area, as shown in FIG. 17. ROM 31 is of an electrically erasable or re-writable type. Memory card 53 is one in which a program for updating data in the ROM 31 and new data in the ROM 31 are stored in advance. The program causes copying of the new data in the newly secured area in the ROM 31 when updating the address area assignment as shown in FIG. 17.

In response to the operation of the ROM data updating switch 250, the CPU 1 executes a program in a memory card 53. As described above, this program causes copying of the new data in the newly secured area of the ROM 31 when updating the address area assignment, and the execution of the program has an effect of updating data in the ROM 31. This means that it is possible to update the data in the ROM 31 without the need of a cumbersome operation such as opening the system housing or replacing the mounted ROM. In addition, it is possible to write the data in the ROM 31 after the mounting thereof as well, so that it is possible to flexibly change or select the combination of various operation steps in the manufacture of the system.

Figure 8:
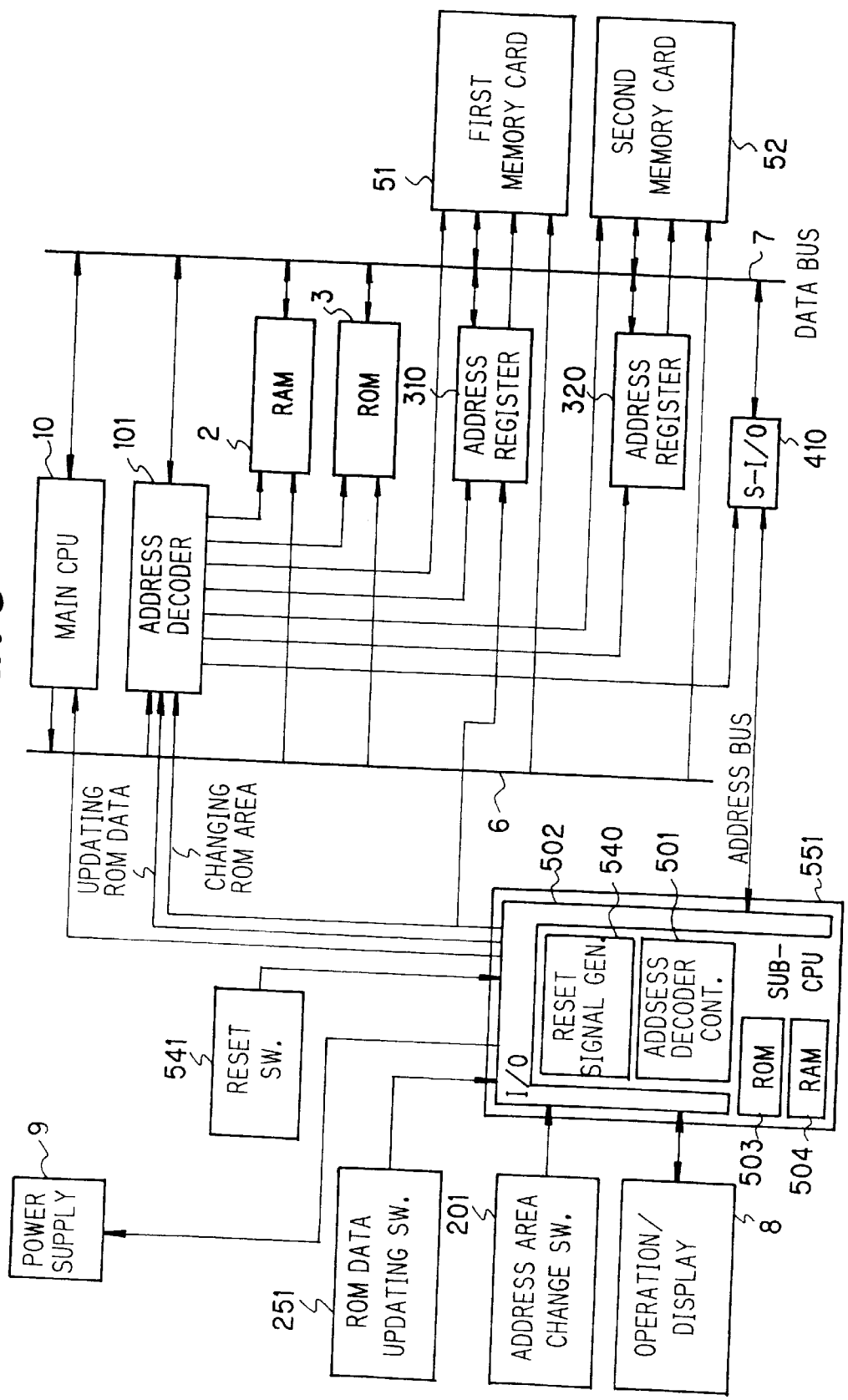

FIG. 8 is a block diagram showing an eighth embodiment of the present invention. This embodiment can be compared to the FIG. 6 sixth embodiment, and it has a structure including a ROM data updating switch 251 which is added to the FIG. 6 structure for ROM data updating.

Specifically, this embodiment employs an address area change switch 201 similar to the address area change switch 200 described before in connection with FIG. 6 and a ROM data updating switch 251 similar to the ROM data updating switch 250 described before in connection with FIG. 7. A sub-CPU 551 recognizes the state of the two switches, i.e., the address area change and ROM data updating switches 201 and 251. On the basis of this recognition, the sub-CPU 551 issues a command for a change of the assignment of the address area in the main CPU 10. That is, in response to the operation of the switch 201 the assignment change of the address area of the main CPU 10 is made as shown in FIG. 16 noted above.

Figure 18:
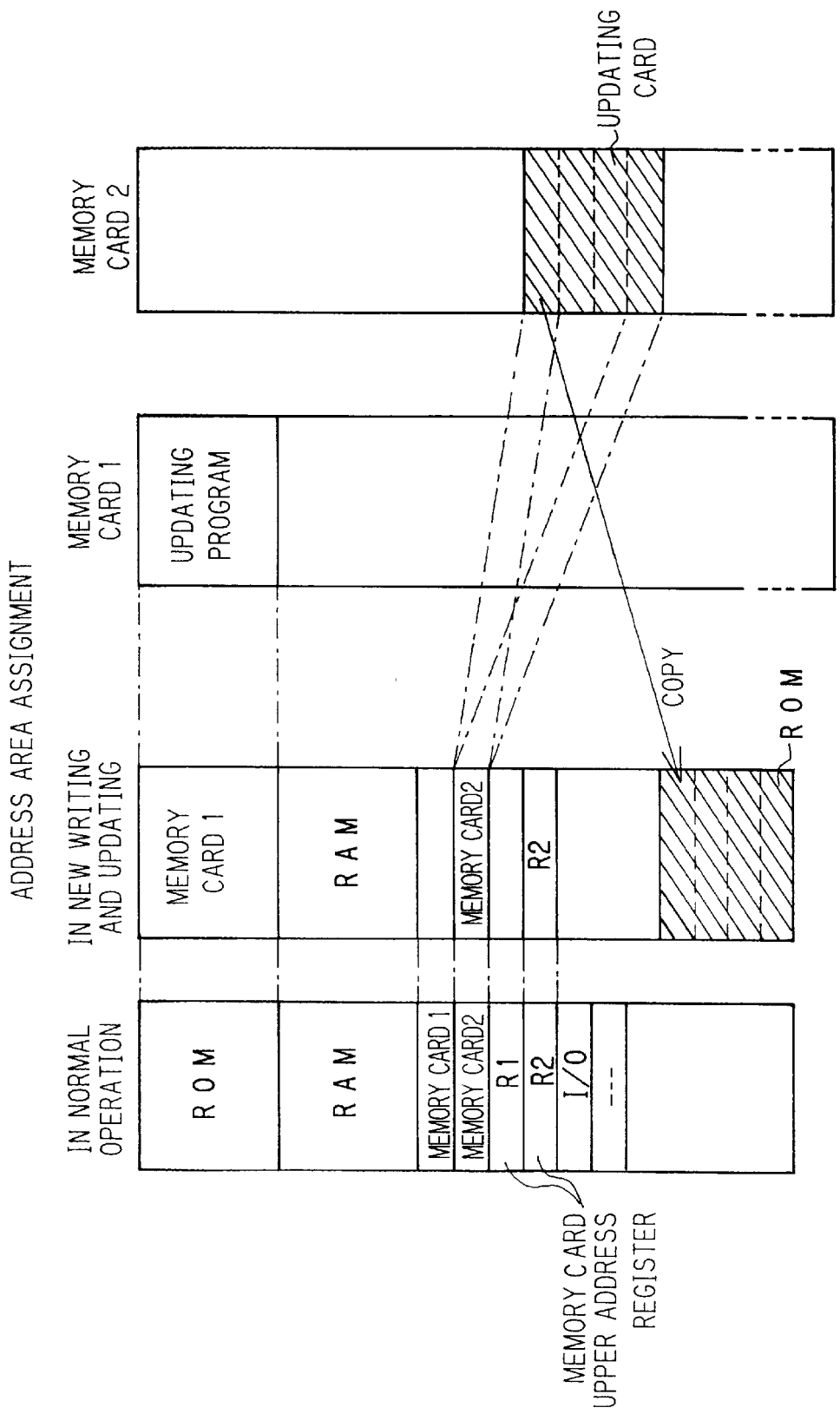

When the ROM data updating switch 251 is operated, the interchange of ROM area and memory card area is made while securing a separate ROM area as shown in FIG. 18 in addition to the address area assignment change as shown in FIG. 16. More specifically, the sub-CPU 551, upon recognition of the operation of the address area change switch 201, outputs an area interchange command for interchanging the ROM area and memory card area, while upon recognition of the operation of the ROM data updating switch 251 it outputs, in addition to the above area interchange command, an updating command for updating the address area assignment in the main CPU 10, thus allowing the operation described above to be executed. The address decoder 101 is adapted to operate according to the two different command inputs; that is, it interchanges the ROM area and memory card area as shown in FIG. 16 when the sole area interchange command is inputted thereto from the sub-CPU 551, and secures a separate ROM area as shown in FIG. 18 when both the area interchange command and assignment updating command are inputted.

As is seen from FIG. 15 which was used for the description of the fourth embodiment, releasing the operation of the ROM data updating switch 251 after completion of the ROM data updating with execution of the updating program stored in memory card 51, causes the main CPU 10 to execute the updated program in the ROM 3.

In this embodiment, like the previous fifth embodiment, the correspondence relation between a memory card and the corresponding address register may be changed. It is thus possible to place new data in any area of the memory card (for instance, the first memory card 51) as shown in FIG. 16. For example, the content of the memory card 51 may be made to have a FAT or directory area conforming to a DOS file system for storing new data as a DOS file.

Figure 9:
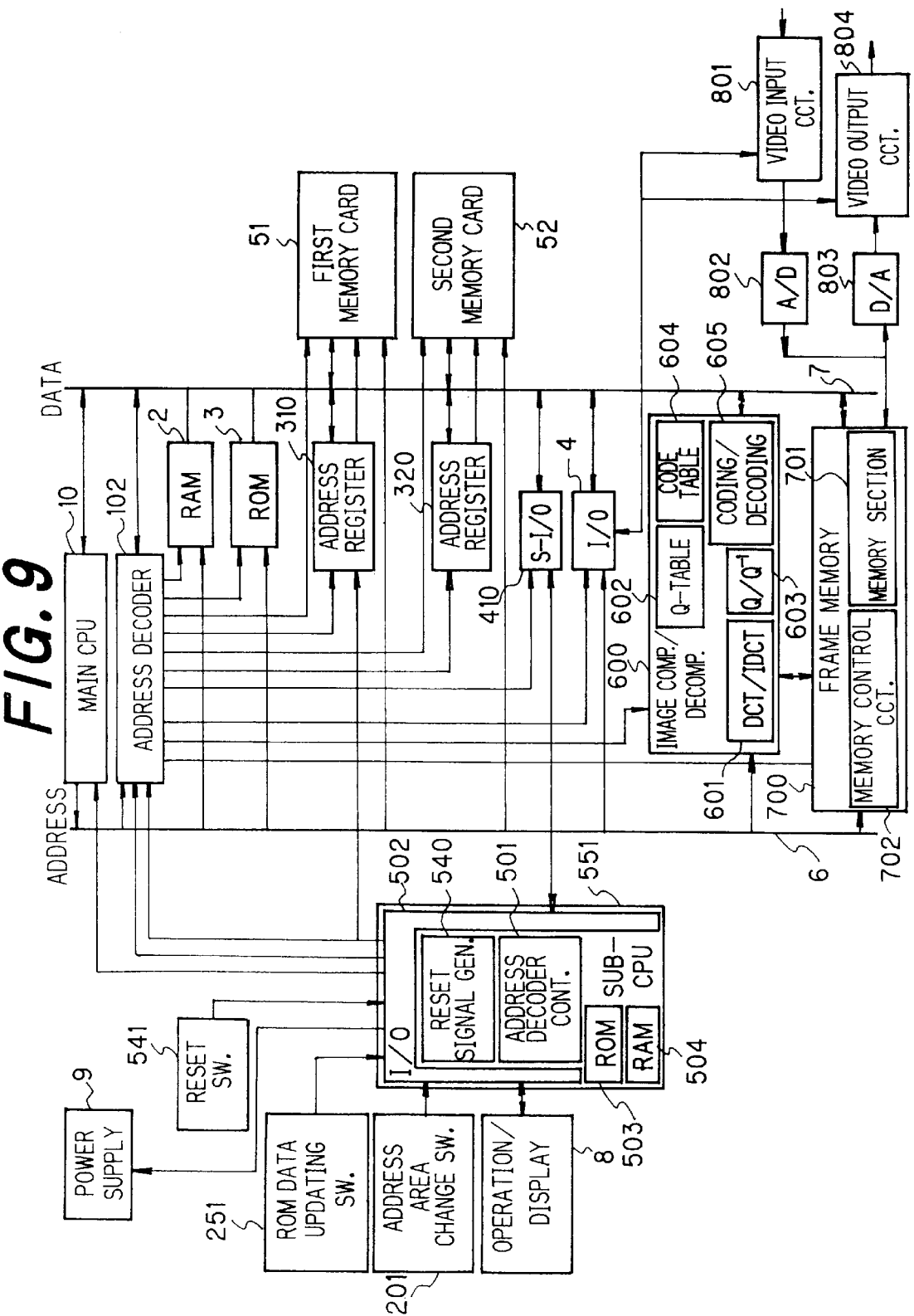

FIG. 9 is a block diagram showing a ninth embodiment of the present invention. Parts like those in the FIG. 8 eighth embodiment are designated by like reference numerals and not given repetitive description. This embodiment is different from the preceding sixth embodiment in that, in lieu of the address decoder 100 in the sixth embodiment, an address decoder 102 is used which has a function of delivering a command to an image compression/decompression circuit 600 and also to a frame memory 700, and also that it is adapted to receive the external video data (or signal) from a video input circuit 801 in the frame memory 700 after conversion to digital video data in an A/D converter 802 and output the digital video data stored in the frame memory 700 after conversion to analog video data (or signal).

The image compression/decompression circuit 600 has a DCT/IDCT circuit 601 for executing DCT (discrete cosine transform) or IDCT (inverse discrete cosine transform) of the video data (digital video data) input, a $Q/Q^{-1}$ (quantizing/inverse quantizing) circuit 603 for quantizing or inverse quantizing the processed data from the DCT/IDCT circuit 601 using a quantization table 602, and a coding/decoding circuit 605 for coding or decoding the processed data from the $Q/Q^{-1}$ circuit 603 using the data in a code table 604. The frame memory 700 has a memory section 701 having a memory function and a memory control function 702 for controlling the writing and reading of data with respect to the memory section 701.

According to this embodiment, the externally supplied video data (i.e., video signal) is received through the video input circuit 801 and A/D converter 802 as digital video data in the frame memory 700. Conversely, the digital video data in the frame memory 700 is outputted through the D/A converter 803 and video output circuit 804 as the analog video data (i.e., video signal) to the outside for observation by monitor means or the like.

In the above structure, the digital video data held in the frame memory 700 is compressed in the image compression/decompression circuit 600. In this process, the quantization table 602 is used for quantization in the $Q/Q^{-1}$ circuit 603, and the coding table 604 is used for coding in the coding/decoding circuit 605. As the table data in the tables 602 and 604, predetermined table data that were previously stored in the ROM 3 are transferred to the tables 602 and 604 for reference. The data transfer is also made when decompressing video data.

When it is desired to change the image quality or data compression factor in this system, it is necessary to change the table data that are preliminarily stored in the ROM 3. This can be done with the provision of address decoder 102 capable of address area switching and ROM data updating switch 251 as described above. That is, it is possible to change the content of the ROM 3, i.e., table data used as the quantization table and coding table, easily without need of the cumbersome operation of ROM replacement by disassembling the system housing and removing the mounted ROM. In other words, in this system it is possible to change the image quality and data compression factor as basic specifications of this type of system without the need to open the system housing.

Figure 10:
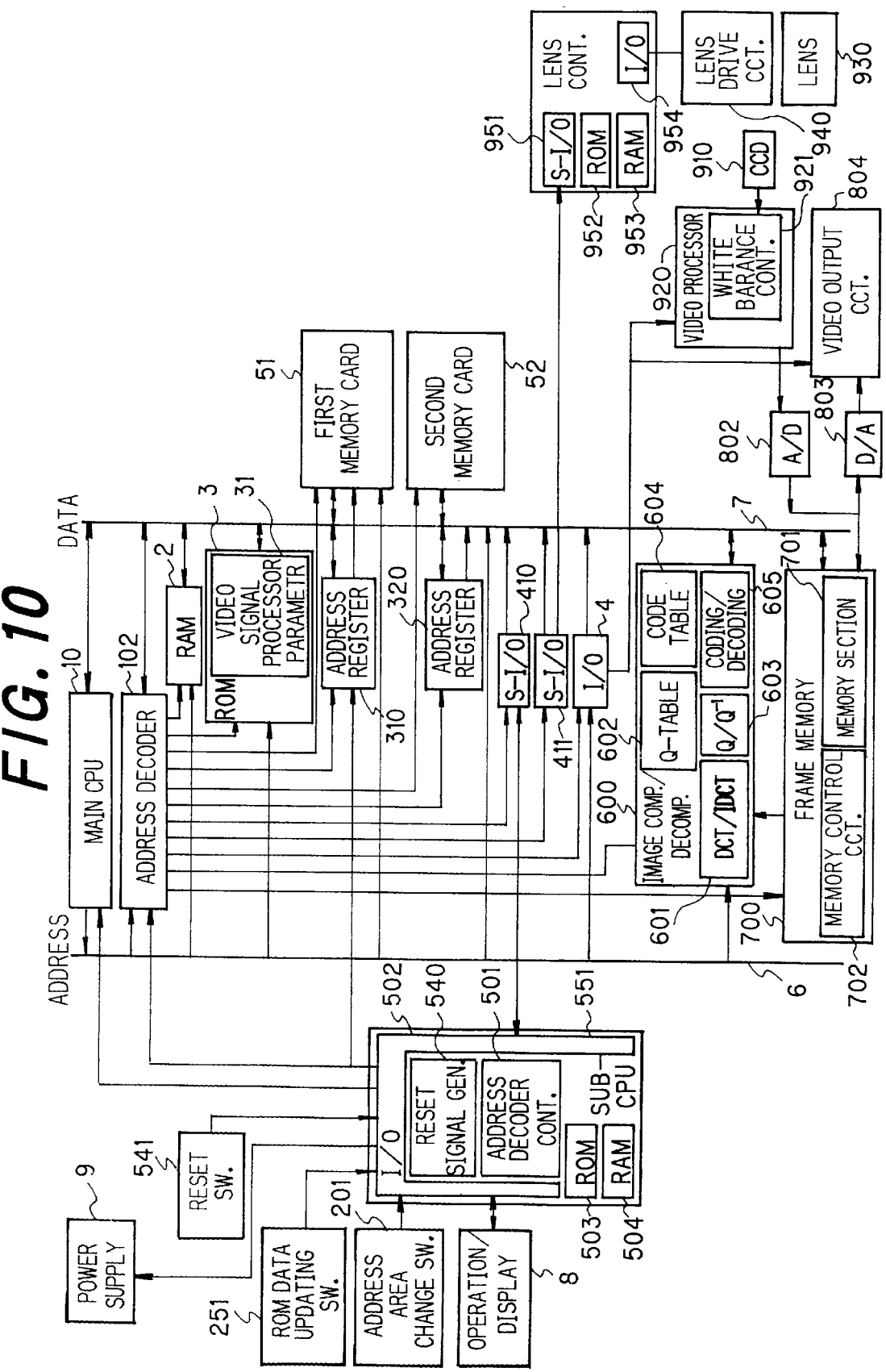

FIG. 10 is a block diagram showing a tenth embodiment of the present invention. In this embodiment, the present invention is applied to an electronic still camera. Many parts of the embodiment are common to those in the preceding ninth embodiment. Again parts like those in the FIG. 9 ninth embodiment are designated by like reference numerals and not given repetitive description.

Referring to FIG. 10, this embodiment again has an A/D converter 802 as described before in connection with the FIG. 9 ninth embodiment. In this embodiment, the video data generated through photoelectric conversion in a solid-state imaging element (CCD) 910 is supplied to the A/D converter 802 as the analog video data obtained through well-known video signal processing of the photoelectric conversion output in a video signal processor 920. The video signal processor 920 has a white balance controller 921 for controlling the white balance of the color data. This video signal processor 920 and also a video output circuit 804 similar to one in the ninth embodiment are operation timing controlled by a control signal from I/O 4.

The system further has a lens 930 for focusing a foreground subject image on the solid-state imaging element (CCD) 910, a lens drive circuit 940 for focal point adjustment or the like concerning the lens 930, and a lens system control CPU 950 for controlling the driving operation of the lens drive circuit 940. The lens system control CPU 950 controlled by the main CPU 10 through a serial I/O (S-I/O) 411 which is selectively adapted under the overall control of the main CPU 10, and also the lens system controller's own serial I/) (S-I/O) 951. The lens system controller 950 is provided with a ROM 952 and a RAM 953 for calculations for the lens system control or the like. The lens system controller 950 is further provided with an I/O 954 for outputting a command signal to the lens drive circuit 940.

In this embodiment, with the provision of address decoder 102 capable of address area switching and ROM data updating switch 251 as in the previous ninth embodiment, it is possible to change the content of ROM 3, i.e., table data used as the quantization table and coding table, easily without need of a cumbersome operation of ROM replacement by disassembling the system housing and removing the mounted ROM. In other words, it is possible to change the image quality and data compression factor as basic specifications of this type of system without the need to open the housing.

A particular effect obtainable with this embodiment, is that the system readily allows the changing of various video signal processor parameters for the purpose of color image recording by shifting the color phase in its imaging operation as a camera. This is so because parameters to be used for such recording are stored in advance as the video signal processor parameters 31 in the ROM 3.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A data processing system comprising:

a CPU;

an address decoder for generating a location designation signal which designates a location of a predetermined area in an address area meeting a predetermined correspondence relation to a numerical address supplied from the CPU, wherein:

the address decoder generates a location designation signal designating a location of an other predetermined area of the address area corresponding to the numerical address supplied from the CPU in an other predetermined correspondence relation different from the predetermined correspondence relation in response to an external operation, and the address decoder designating, according to the location designation signal designating the location in the other predetermined correspondence relation, a location in a solid state memory capable of being loaded in and unloaded from the data processing system as a location equivalent to a location of a non-volatile memory in which CPU programs and operation parameters are stored;

a memory securing locations of a plurality of areas capable of being designated by the location designation signal from the address decoder;

resetting means for resetting the CPU when a supply voltage supplied to the data processing system is not meeting a prescribed level or when initializing means for initializing the data processing system is operated; and operating means for causing an operation of the address decoder to switch a correspondence relation between the numerical address supplied from the CPU and the location of a corresponding predetermined area in the address area, between the predetermined correspondence relation and the other predetermined correspondence relation, the operating means comprising:

state maintaining means, which functions in response to an initial operation of the operating means, for obtaining, upon release of resetting by the resetting means, a state for specifying a correspondence relation switching operation and for maintaining the obtained state so as not to change the obtained state by an operation of the initializing means subsequent to an initial operation thereof, the correspondence relation switching operation being provided on the address decoder according to an output of the state maintaining means.

2. A data processing system comprising:

a main CPU;

an address decoder for specifying a location of a predetermined area in an address area that meets a predetermined correspondence relation to a numerical address supplied from the main CPU to output a location designation signal designating the location, the address decoder being capable of outputting, in response to an external operation, a location designation signal designating a location of a solid state memory, which can be loaded in and unloaded from the data processing system, as a predetermined area location in the address area corresponding to the numerical address supplied from the main CPU with a different correspondence relation than the predetermined correspondence relation, which is a location equivalent to a location of a non-volatile memory in which main CPU programs and operation parameters are stored; and a sub-CPU for providing a correspondence relation switching operation for switching a correspondence relation between the numerical address supplied from the main CPU and a location of a corresponding predetermined area in the address area in the address decoder, between the predetermined correspondence relation and the different correspondence relation, wherein:

the sub-CPU recognizes and memorizes a correspondence relation to be selected by selecting means for selecting a correspondence relation between the numerical address supplied from the main CPU and the location of the corresponding predetermined area in the address area in the address decoder when the system is started, supplies a reset signal to the main CPU, causes a power supply circuit to supply power to the main CPU, and supplies the recognized and memorized correspondence relation to be selected to the address decoder just prior to the reset signal being released, upon an operation of initializing means of the data processing system after a start of the data processing system, the sub-CPU recognizes and memorizes the correspondence relation as prescribed by the selecting means, supplies the reset signal to the main CPU, and supplies the correspondence relation to be selected, as recognized and memorized just prior to the reset signal being released, to the address decoder.

3. A data processing system comprising:

a main CPU;

an address decoder for specifying a location of a predetermined area in an address area that meets a predetermined correspondence relation to a numerical address supplied from the main CPU to output a location designation signal designating the location, the address decoder being capable of outputting, in response to an external operation, a location designation signal designating a location of a solid-state memory, which can be loaded in and unloaded from the data processing system, as a predetermined area location in the address area corresponding to the numerical address supplied from the main CPU with a different correspondence relation than the predetermined correspondence relation, which is a location equivalent to a location of a non-volatile memory in which main CPU programs and operation parameters are stored;

a sub-CPU including an address decoder controller for controlling an address area assignment function by the address decoder and a reset signal generator for generating a reset signal; and data re-writing means for, when a program for updating data in the non-volatile memory and data to be newly stored in the non-volatile memory are stored in a pertinent location of the solid-state memory, according to a correspondence relation operation of the sub-CPU, for executing a program for updating the data in the nonvolatile memory in the pertinent location of the solid-state memory, and for starting an operation of rewriting the data in a pertinent location of the non-volatile memory with the data to be newly stored in the non-volatile memory, wherein:

the sub-CPU executes a correspondence relation switching operation and causes the data re-writing means to perform a data re-writing operation, and the sub-CPU communicates with the main CPU via a serial I/O to allow the main CPU to recognize a state of an operating system or a display system.

* * * * *